United States Patent
Dutta et al.

(10) Patent No.: US 10,589,216 B2
(45) Date of Patent: Mar. 17, 2020

(54) MEMBRANES FOR FLUID SEPARATION

(71) Applicant: OHIO STATE INNOVATION FOUNDATION, Columbus, OH (US)

(72) Inventors: Prabir Kumar Dutta, Worthington, OH (US); Yanzuo Li, Columbus, OH (US); Bo Wang, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 161 days.

(21) Appl. No.: 15/526,908

(22) PCT Filed: Nov. 13, 2015

(86) PCT No.: PCT/US2015/060681
§ 371 (c)(1),
(2) Date: May 15, 2017

(87) PCT Pub. No.: WO2016/077755
PCT Pub. Date: May 19, 2016

(65) Prior Publication Data
US 2017/0341017 A1    Nov. 30, 2017

Related U.S. Application Data

(60) Provisional application No. 62/079,421, filed on Nov. 13, 2014.

(51) Int. Cl.
*B01D 53/22* (2006.01)
*B01D 71/02* (2006.01)
(Continued)

(52) U.S. Cl.
CPC ........... *B01D 53/228* (2013.01); *B01D 69/10* (2013.01); *B01D 71/028* (2013.01);
(Continued)

(58) Field of Classification Search
CPC ........... B01D 53/228; B01D 2053/221; B01D 67/0051; B01D 71/028; B01D 2257/504;
(Continued)

(56) References Cited

U.S. PATENT DOCUMENTS 6,069,013 A    3/2000  Plog et al.
6,190,638 B1 *  2/2001  Anthonis ............. B01D 71/028
                                                    423/702

(Continued)

FOREIGN PATENT DOCUMENTS

WO      2002038259      5/2002

OTHER PUBLICATIONS

Bein, T. Synthesis and Applications of Molecular Sieve Layers and Membranes, Chem. Mater. 1996, 8, 1636-1653.

(Continued)

*Primary Examiner* — Jason M Greene
(74) *Attorney, Agent, or Firm* — Meunier Carlin & Curfman LLC

(57) ABSTRACT

Membranes, methods of making the membranes, and methods of using the membranes are described herein. The membranes can comprise a gas permeable support and a continuous phase comprising a selective inorganic material disposed within the gas permeable support. In some embodiments, the membranes can exhibit a $CO_2:N_2$ selectivity of at least 10 at 24° C. The membranes can be bendable, such that when the membranes are wrapped around a 1.5-inch diameter cylinder and returned to a planar conformation, the $CO_2:N_2$ selectivity of the membranes is at least 25% of the $CO_2:N_2$ selectivity of the membranes prior to having been wrapped around the cylinder.

23 Claims, 21 Drawing Sheets

(51) Int. Cl.
    B01D 69/10    (2006.01)
    C01B 39/20    (2006.01)
    C01B 39/40    (2006.01)
    C01B 39/04    (2006.01)
(52) U.S. Cl.
    CPC .... B01D 2053/221 (2013.01); B01D 2256/22 (2013.01); B01D 2257/404 (2013.01); B01D 2257/504 (2013.01); C01B 39/04 (2013.01); C01B 39/205 (2013.01); C01B 39/40 (2013.01)
(58) Field of Classification Search
    CPC .... C01B 3/02; C01B 3/04; C01B 3/20; C01B 3/22; C01B 3/24; C01B 3/38; C01B 3/40; C01B 39/02; C01B 39/04; C01B 39/20; C01B 39/22; C01B 39/24; C01B 39/38; C01B 39/40; C01B 39/205
    See application file for complete search history.

(56) References Cited

U.S. PATENT DOCUMENTS

| | | | |
|---|---|---|---|
| 6,508,860 B1 | 1/2003 | Kulkarni et al. | |
| 6,626,980 B2 | 9/2003 | Hasse et al. | |
| 7,125,536 B2 | 10/2006 | Fu et al. | |
| 7,138,006 B2 | 11/2006 | Miller et al. | |
| 7,194,891 B2 | 3/2007 | Tuller et al. | |
| 7,637,983 B1 | 12/2009 | Liu et al. | |
| 9,561,477 B2 * | 2/2017 | Dutta | B01D 67/0051 |
| 2005/0127920 A1 | 1/2005 | Mowery et al. | |
| 2006/0211123 A1 | 9/2006 | Ker et al. | |
| 2007/0071666 A1 | 3/2007 | Larsen et al. | |
| 2014/0352533 A1 * | 12/2014 | Falconer | B01D 53/228 95/51 |
| 2015/0273401 A1 * | 10/2015 | Miller | B01D 71/028 210/500.25 |

OTHER PUBLICATIONS

Bowen, et al., Fundamentals and applications of pervaporation through zeolite membranes, J. Membr. Sci. 2004, 245, 1-33.
Brinkmann, et al., Theoretical and Experimental Investigations of Flat Sheet Membrane Module Types for High Capacity Gas Separation Applications, Chem. Ing. Tech. 2013, 85, 1210-1220.
Calero, et al., Understanding the role of sodium during adsorption: a force field for alkanes in sodium-exchanged faujasites, J. Am. Chem. Soc. 2004, 126, 11377-11386.
Caro, et al., Zeolite membranes—Recent developments and progress Microporous Mesoporous Mater. 2008, 115, 215-233.
Caro, et al., Why is it so extremely difficult to prepare shape-selective Al-rich zeolite membranes like LTA and FAU for gas separation? Sep. Purif. Technol. 2009, 66, 143-147.
Caro, et al., Zeolite membranes—state of their development and perspective, Microporous Mesoporous Mater. 2000, 38, 3-24.
Chen, et al., Functional defect-patching of a zeolite membrane for the dehydration of acetic acid by pervaporation, J. Membr. Sci. 2011, 369, 506-513.
Cheng, et al., Novel synthesis of FAU-type zeolite membrane with high performance, Chem. Commun. 2004, 1718-1719.
Chetty, et al., Measurement of the electric quadrupole moments of $CO_2$ and OCS, Mol. Phys. 2011, 109, 655-666. Abstract.
Chiu, et al., Post-synthesis defect abatement of inorganic membranes for gas separation, J. Membr. Sci. 2011, 377, 182-190.
Cundy, et al., The hydrothermal synthesis of zeolites: Precursors, intermediates and reaction mechanism, Microporous Mesoporous Mater. 2005, 82, 1-78.
Down, Smoothing out zeolite nanosheet synthesis, Chem. World, 2011.

Franke, et al., Development and working principle of an ammonia gas sensor based on a refined model for solvate supported proton transport in zeolites, Phys. Chem. Chem. Phys., 2003, 5, 5195-5198.
Fulmer, et al., Novel strategies for development of gas sensors for combustion and medical applications, Proc. SPIE 9083, Micro- and Nanotechnology Sensors, Systems, and Applications VI, 2014, 90830W.
Gascon, et al., Practical Approach to Zeolitic Membranes and Coatings: State of the Art, Opportunities, Barriers, and Future Perspectives, Chem. Mater. 2012, 24, 2829-2844.
Ge, et al., Effects of the synthesis hydrogel on the formation of zeolite LTA membranes, Microporous Mesoporous Mater. 2012, 151, 303-310.
Gu, et al., Synthesis of Defect-Free FAU-Type Zeolite Membranes and Separation for Dry and Moist $CO_2/N_2$ Mixtures, Ind. Eng. Chem. Res. 2005, 44, 937-944.
Guillou, et al., Synthesis of FAU-type zeolite membrane: An original in situ process focusing on the rheological control of gel-like precursor species, Microporous Mesoporous Mater. 2009, 119, 1-8.
Hasegawa, et al., Effect of temperature on the gas permeation properties of NaY-type zeolite formed on the inner surface of a porous support tube, Chem. Eng. Sci. 2001, 56, 4273-4281.
Hasegawa, et al., Influence of alkali cations on permeation properties of Y-type zeolite membranes Sci. 2002, 208, 415-418.
Hasegawa, et al., the separation of CO2 using Y-type zeolite membranes ion-exchanged with alkali metal cations Sep. Purif. Technol. 2001, 22-23, 319-325.
Henis, et al., A Novel Approach to Gas Separations Using Composite Hollow Fiber Membranes, Sep. Sci. Technol. 1980, 15, 1059-1068.
Holmberg, et al., Controlling size and yield of zeolite Y nanocrystals using tetramethylammonium bromide, Microporous Mesoporous Mater. 2003, 59, 13-28.
Huang, et al., Seeding-free synthesis of dense zeolite FAU membranes on 3-aminopropyltriethoxysilane-functionalized alumina supports, J. Membr. Sci. 2012, 389, 272-279.
Hussain, et al., Mixed-Matrix Membrane for Gas Separation: Polydimethylsiloxane Filled with Zeolite, Chem. Eng. Technol. 2012, 35, 561-569.
International Search Report and Written Opinion issued in Application. No. PCT/US2015/060681, dated Jan. 29, 2016.
Kapko, et al., Flexibility of ideal zeolite frameworks, Phys. Chem. Chem. Phys., 2010, 12, 8531-8541.
Kim, et al., An Integrated Zeolite Membrane/$RuO_2$ Photocatalyst System for Hydrogen Production from Water, J. Phys. Chem. C 2007, 111, 10575-10581.
Kusakabe, et al., Formation of a Y-Type Zeolite Membrane on a Porous α-Alumina Tube for Gas Separation, Ind. Eng. Chem. Res. 1997, 36, 649-655.
Kusakabe, et al., Gas permeation properties of ion-exchanged faujasite-type zeolite membranes, AIChE J. 1999, 45, 1220-1226.
Kusakabe, et al., Separation of carbon dioxide from nitrogen using ion-exchanged faujasite-type zeolite membranes formed on porous support tubes, J. Membr. Sci. 1998, 148, 13-23.
Kuzniatsova, et al., Zeta potential measurements of zeolite Y: Application in homogeneous deposition of particle coatings, Microporous Mesoporous Mater. 2007, 103, 102-107.
Lee, et al., Charge Transport through a Novel Zeolite Y Membrane by a Self-Exchange Process, J. Phys. Chem. B 2002, 106, 11898-11904.
Liu, et al., High permeability and salt rejection reverse osmosis by a zeolite nano-membrane, Phys. Chem. Chem. Phys., 2013, 15, 6817-6824.
McLeary, et al., Zeolite based films, membranes and membrane reactors: Progress and prospects, Microporous Mesoporous Mater. 2006, 90, 198-220.
Noack, et al., Effect of crystal intergrowth supporting substances (ISS) on the permeation properties of MFI membranes with enhanced Al-content J. Microporous Mesoporous Mater. 2006, 97, 88-96.
Noack, et al., Proof of the ISS-concept for LTA and FAU membranes and their characterization by extended gas permeation studies, J. Microporous Mesoporous Mater. 2007, 102, 1-20.

(56) References Cited

OTHER PUBLICATIONS

Nomura, et al., Silicalite Membranes Modified by Counterdiffusion CVD Technique Ind. Eng. Chem. Res. 1997, 36, 4217-4223.
Pera-Titus, Porous Inorganic Membranes for $CO_2$ Capture: Present and Prospects M. Chem. Rev. 2014, 114, 1413-1492.
Phumman, et al., Fabrication of Poly(p-Phenylene)/Zeolite Composites and Their Responses Towards Ammonia, Sensors 2009, 9(10), 8031-8046.
Pina, et al., Zeolite films and membranes. Emerging applications, Microporous Mesoporous Mater. 2011, 144, 19-27.
Reis, et al., Zeolite-based Impedimetric Gas Sensor Device in Low-cost Technology for Hydrocarbon Gas Detection, Sensors 2008, 8, 7904-7916.
Rodríguez-González, et al., NH3-TPD measurements using a zeolite-based sensor, Measurement Science and Technology, 21:2, 2010.
Seike, et al., Preparation of FAU type zeolite membranes by electrophoretic deposition and their separation properties, J. Mater. Chem. 2002, 12, 366-368.
Severance, et al., Rapid Crystallization of Faujasitic Zeolites: Mechanism and Application to Zeolite Membrane Growth on Polymer Supports, Langmuir 2014, 30, 6929-6937.
Snider, et al., Gas sorption studies on Zeolite Y membrane materials for post-combustion $CO_2$ capture in coal-fired plant, Microporous Mesoporous Mater. 2014, 192, 3-7.
Song, et al., High yield method for nanocrystalline zeolite synthesis, Chem. Commun. 2005, 2951-2953.
Song, et al., Zeolitic imidazolate framework (ZIF-8) based polymer nanocomposite membranes for gas separation, Energy Environ. Sci., 2012, 5, 8359-8369.

Tang, et al., Acidic ZSM-5 zeolite-coated long period fiber grating for optical sensing of ammonia, J. Mater. Chem., 2011, 21, 181-186.
Tang, et al., Modified ZSM-5 zeolite film-integrated fiber optic sensors for ammonia detection, Proc. SPIE 7312, Advanced Environmental, Chemical, and Biological Sensing Technologies VI, 2009, 73120C.
Tavolaro, et al., Zeolite Membranes, Adv. Mater. 1999, 11, 975-996.
Varoon, et al., Dispersible Exfoliated Zeolite Nanosheets and Their Application as a Selective Membrane, Science 2011, 334, 72-75.
Wang, et al., High Performance Zeolite LTA Pervaporation Membranes on Ceramic Hollow Fibers by Dipcoating—Wiping Seed Deposition, J. Am. Chem. Soc. 2009, 131, 6910-6911.
Wang, et al., Nanostructured zeolite 4A molecular sieving air separation membranes, Chem. Commun. 2002, 1708-1709.
Wee, et al., Membrane separation process—Pervaporation through zeolite membrane, Sep. Purif. Technol. 2008, 63, 500-516.
White, et al., Synthesis of Ultrathin Zeolite Y Membranes and their Application for Separation of Carbon Dioxide and Nitrogen Gases, Langmuir 2010, 26, 10287-10293.
Yu, et al., Flexible nanostructure of MFI zeolite membranes, Journal of Membrane Science 298, 2007, 182-189.
Zhan, et al., High performance zeolite NaA membranes synthesized on the inner surface of zeolite/PES—PI blend composite hollow fibers, J. Membr. Sci. 2014, 471, 299-307.
Zheng, et al., Interaction of ammonia with intrazeolitic silver ions: Development of an ammonia sensor, Sensors and Actuators B: Chemical, 193, 2014, 542-551.
Zhu, et al., FAU-type zeolite membranes synthesized by microwave assisted in situ crystallization, Mater. Lett. 2008, 62, 4357-4359.

\* cited by examiner

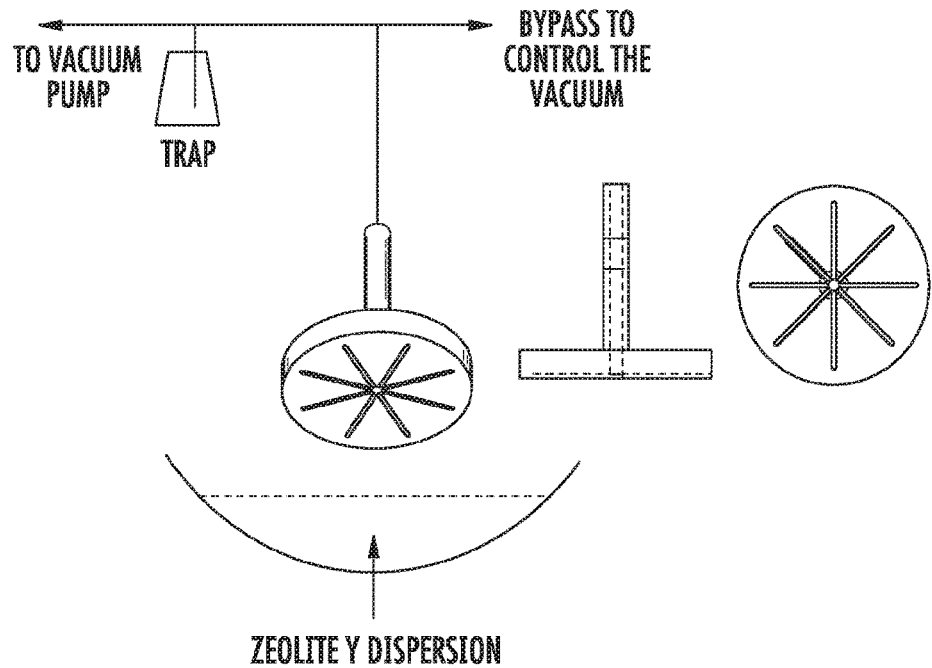
FIG. 20
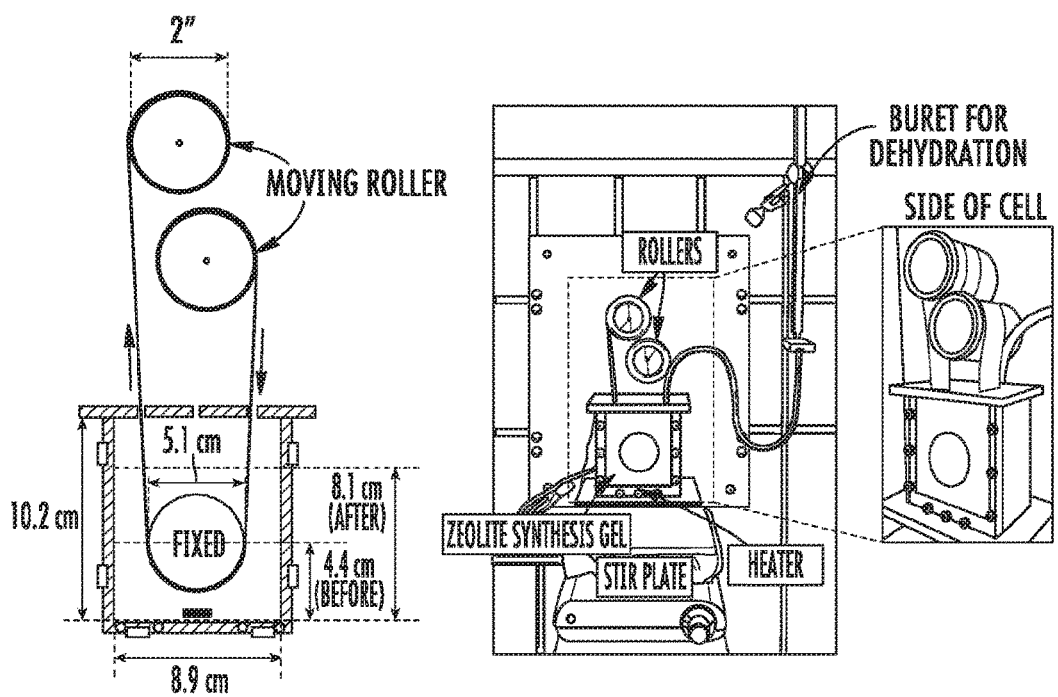
FIG. 21A
FIG. 21B

MEMBRANES FOR FLUID SEPARATION

CROSS REFERENCE TO RELATED APPLICATIONS

This application is a national stage application filed under 35 U.S.C. § 371 of PCT/US2015/060681 filed Nov. 13, 2015, which claims the benefit of U.S. Provisional Application No. 62/079,421, filed Nov. 13, 2014, which is incorporated herein by reference in its entirety.

STATEMENT REGARDING FEDERALLY SPONSORED RESEARCH OR DEVELOPMENT

This invention was made with Government Support under Grant No. DE-FE0007632 awarded by the U.S. Department of Energy, National Energy Technology Laboratory. The Government has certain rights in the invention.

FIELD OF THE DISCLOSURE

This disclosure relates generally to membrane structures, more particularly, to membrane structures for the separation of fluids (e.g., for the separation of at least one gas from a gaseous mixture, or for the separation of at least one liquid from a liquid mixture).

BACKGROUND OF THE DISCLOSURE

There are numerous industrial processes that produce gas streams containing carbon dioxide, hydrogen sulfide, hydrogen chloride, nitrogen oxide, and sulfur oxide. It is often desirable to remove one or more of these gases from the other components of the gas streams, such as hydrogen and nitrogen. Inorganic membranes have been employed for a variety of gas separation applications, including hydrogen purification and carbon dioxide sequestration. However, a major limiting factor to the application of inorganic membranes is the frequent occurrence of defects which limits reproducibility, stability, and the separation performance of the membranes. There remains a need in the art for membranes, methods of making membranes, and methods of separating gases.

SUMMARY

Membranes, methods of making the membranes, and methods of using the membranes are described herein. The membranes can comprise a porous gas permeable support and a continuous phase comprising a selective inorganic material disposed within the gas permeable support. In some embodiments, the membrane can have a $CO_2:N_2$ selectivity of at least 10 at 24° C. and 1 atm feed pressure (e.g., from 10 to 500 at 24° C. and 1 atm feed pressure, or from 75 to 350 at 24° C. and 1 atm feed pressure).

In some embodiments, the membrane can have a $CO_2$ permeability of at least 500 at 24° C. and 1 atm feed pressure (e.g., from 500 to 5000 at 24° C. and 1 atm feed pressure, from 1000 to 5000 at 24° C. and 1 atm feed pressure, or from 2000 to 5000 at 24° C. and 1 atm feed pressure). The membrane can be bendable. For example, the membrane can be bendable, such that when the membranes are wrapped around a 1.5-inch diameter cylinder and returned to a planar conformation, the $CO_2:N_2$ selectivity of the membranes is at least 25% of the $CO_2:N_2$ selectivity (e.g., at least 50% of the $CO_2:N_2$ selectivity, at least 75% of the $CO_2:N_2$ selectivity, or at least 90% of the $CO_2:N_2$ selectivity) of the membranes prior to having been wrapped around the cylinder. In some cases, the gas permeable support and the continuous phase can optionally comprise one or more sub-layers. In some cases, the membrane can further comprise one or more additional layers, such as a coating layer. In some embodiments, the membrane can have an average thickness of from 250 nm to 1 micron.

The porous gas permeable support can comprise a gas permeable polymer. The gas permeable polymer can comprise a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer can comprise polyethersulfone. In some cases, the gas permeable support can comprise a gas permeable polymer disposed on a base. The base can comprise a non-woven fabric. In certain cases, the non-woven fabric can comprise fibers formed from a polyester.

The inorganic material can be selected from the group consisting of alkaline earth metal oxides; transition metal oxides; lanthanide metal oxides; group IVA metal oxides; transition metals; transition-metal catalysts; metal alloys; silicates; alumino-silicates; clays; and combinations thereof. In some embodiments, the inorganic material comprise a silicate, an alumino-silicate, or a combination thereof. In certain embodiments, the inorganic material comprises a zeolite (e.g., a zeolite having a faujasite structure, such as zeolite Y).

In some embodiments, the membrane can further comprise a coating layer disposed on a surface of the gas permeable support. The coating layer can comprise a polymer. Examples of suitable polymers include polysulphones, polyethersulphones, cellulose acetates, polyamides, polyimides, polypyrrolones, cross-linked polyimides, polyether ketones, polyetherether ketones, polyetherimides, silicone rubbers, nitrile rubbers, neoprene rubbers, silicones, polycarbonates, polyarylenes, polyphenylene ethers, polyolefin elastomers, polybutadienes, vinyl polymers, polyalkalyenes, fluoropolymers, polymeric organosilicones, combinations thereof, and copolymers thereof. In some embodiments, the coating layer can comprise a polymeric organosilicone. In some embodiments, the polymeric organosilicone can be polydimethylsiloxane (PDMS).

Methods of making the membranes are also disclosed. Methods of making membranes can comprise (a) heating an alumino-silicate growth solution comprising a silicon source, an aluminum source, a base, and a first solvent; (b) concentrating the alumino-silicate growth solution; (c) contacting a porous gas permeable support with the alumino-silicate growth solution, wherein the gas permeable support further comprises a population of alumino-silicate seed particles disposed within the gas permeable support; and (d) diluting the alumino-silicate growth solution. The gas permeable support can remain in contact with the alumino-silicate growth solution for a period of time effective to form a continuous phase comprising an alumio-silicate disposed within the gas permeable support. In some embodiments, steps (a) to (d) are carried out over a period of from 2 hours to 36 hours. In certain embodiments, the method can be used in a planar process to prepare alumino-silicate membranes. In some embodiments, steps (a) to (d) are carried out over a period of two hours or less. In certain embodiments, the method can be used in a continuous roll-to-roll process to prepare alumino-silicate membranes.

Methods of making an alumino-silicate nanoparticles are also disclosed. Methods of making an alumino-silicate nanoparticles can comprise (a) heating a first mixture comprising a silicon source, an aluminum source, a base, an organic agent, and a first solvent to produce a first population of alumino-silicate nanoparticles dispersed in a first supernatant; (b) separating the first population of inorganic nanoparticles from the first supernatant; (c) adding a base to the first supernatant to form a second mixture; (d) heating the second mixture to produce a second population of alumino-silicate nanoparticles dispersed in a second supernatant; and (e) separating the second population of inorganic nanoparticles from the second supernatant. The first population of alumino-silicate nanoparticles and the second population of alumino-silicate nanoparticles prepared by the methods described herein can each have an average particle size of 100 nm or less.

In some embodiments, step (d) can further comprise concentrating the second supernatant to form a concentrated supernatant, and diluting the concentrated supernatant the reform the second supernatant. In some embodiments, step (d) can further comprise concentrating the second supernatant to form a concentrated supernatant, heating the concentrated supernatant, and diluting the concentrated supernatant the reform the second supernatant. If desired, steps (c) and (d) can be repeated one or more times (e.g., at least five times) prior to performing step (e) to efficiently prepare alumino-silicate nanoparticles (e.g., zeolite nanoparticles, for example zeolite nanoparticles having a faujasite structure such as zeolite Y nanoparticles). In some embodiments, steps (c) and (d) are repeated until the yield of the second population of alumino-silicate nanoparticles is at least 75% (e.g., optionally prior to separation step (e)).

BRIEF DESCRIPTION OF THE DRAWINGS

The accompanying drawings, which are incorporated in and constitute a part of this specification, illustrate several embodiments of this disclosure and together with the description, serve to explain the principles described herein.

FIG. 20 is a schematic of a set-up used to in vacuum-assisted dip-coating.

FIGS. 21A-21B illustrates the experimental setup used for the roll-to-roll synthesis of membranes. FIG. 21A shows a schematic illustration of the experimental setup used for the roll-to-roll synthesis of membranes. FIG. 21B shows a photo of the experimental setup used for the roll-to-roll synthesis of membranes.

DETAILED DESCRIPTION

Figure 1:
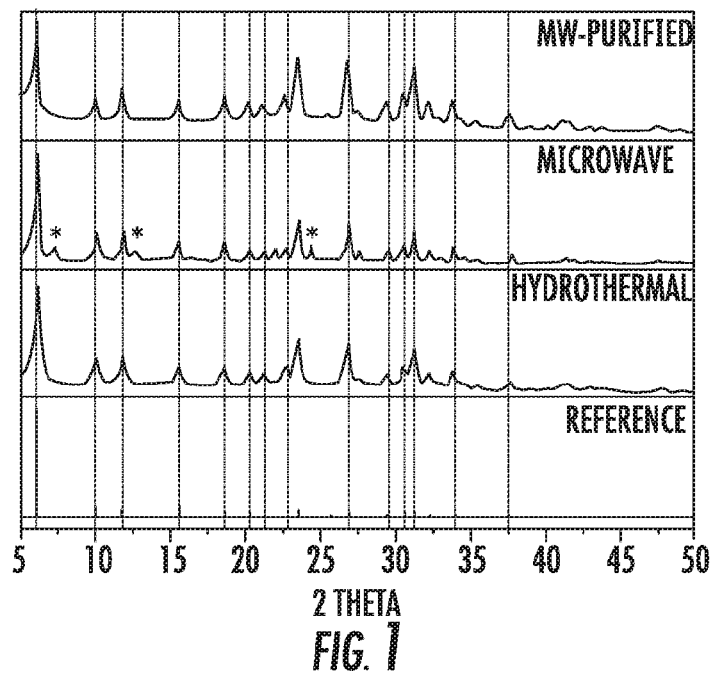
FIG. 1 shows X-ray diffraction of nanozeolite synthesized by hydrothermal synthesis with microwave irradiation.

Membranes, methods of making the membranes, and methods of using the membranes are described herein.

The membranes can comprise a porous gas permeable support and a continuous phase comprising a selective inorganic material disposed (e.g., grown) within the gas permeable support. In some cases, the gas permeable support and the continuous phase can optionally comprise one or more sub-layers. In some cases, the membrane can further comprise one or more additional layers, such as a coating layer.

The gas permeable support can be a porous layer that comprises a plurality of substantially connected pores. "Substantially connected" as used herein, refer to pores that are connected with each other, and substantially extend from a surface of the support layer to an inner portion of the support layer.

The gas permeable support layer can be formed from any suitable material. The material used to form the gas permeable support layer can be chosen based on the end use application of the membrane. In some embodiments, the gas permeable support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, polymeric organosilicones, fluorinated polymers, polyolefins, copolymers thereof, or blends thereof. Specific examples of polymers in the gas permeable support layer can include polydimethylsiloxane, polydiethylsiloxane, polydi-isopropylsiloxane, polydiphenylsiloxane, polyethersulfone, polyphenylsulfone, polysulfone, partially fluorinated or perfluorinated derivatives thereof, copolymers thereof, or blends thereof. In some embodiments, the gas permeable polymer can be polyethersulfone. If desired, the gas permeable support layer can include inorganic particles to increase the mechanical strength without altering the permeability of the support layer.

In some embodiments, the gas permeable support layer can comprise a non-polymeric material. Examples of such materials include porous, flexible solids such as porous metal films or foils and woven or non-woven fabrics.

The gas permeable support layer can comprise pores with an average diameter of from about 10 nm or greater. For example, the gas permeable support layer can comprise pores with an average diameter of from about 10 nm to about 1 micron (e.g., 1 micron or less, 750 nm or less, 500 nm or less, 250 nm or less, 200 nm or less, 150 nm or less, 100 nm or less, 90 nm or less, 80 nm or less, 70 nm or less, 60 nm or less, or 50 nm or less). In certain embodiments, the pores can have an average diameter of from about 10 nm to about 200 nm, about 10 nm to about 150 nm, about 10 nm to about 100 nm, about 10 nm to about 90 nm, or about 10 nm to about 80 nm). For example, the pores can have an average diameter of about 60 nm.

In certain embodiments, the gas permeable support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester.

A continuous phase comprising a selective inorganic material is disposed within the gas permeable support. "Continuous," as used herein, refers to a phase such that all points within the phase are directly connected, so that for any two points within a continuous phase, there exist a path which connects the two points without leaving the phase. A "phase" in this context can refer to, for example, a network of porous inorganic material disposed within the gas permeable support.

The inorganic material can comprise a variety of suitable materials. In certain embodiments, the inorganic material can be selected to have a surface chemistry that is compatible with the gas permeable support. For example, in certain cases, the inorganic material can comprise a hydrophilic material. Examples of suitable inorganic material include alkaline earth metal oxides, transition metal oxides, lanthanide metal oxides, group IVA metal oxides, transition metals, transition-metal catalysts, transition metals adsorbed on a non-reactive support, metal alloys, silicates, aluminosilicates, clays, and combinations thereof. Specific examples of inorganic material include alumina, silica, zeolite, titania, zirconia, palladium, platinum, nickel, transition-metal catalysts, and combinations thereof.

In certain embodiments, the inorganic material can be chosen from silicate, alumino-silicate, or combinations thereof. In certain embodiments, the inorganic material can comprise zeolite. The zeolite can comprise zeolites having varying frameworks and differing Si/Al ratios. In some embodiments, the inorganic material can comprise a zeolite having a faujasite structure. For example, the inorganic material can be zeolite Y.

In some cases, the membrane can further comprise one or more additional layers, such as a coating layer disposed on the gas permeable support. When present, the coating layer can reduce the overall influence defects have upon permeability and selectivity of the membrane. In some embodiments, the coating layer can restore the selectivity and permeability of the membrane to near intrinsic values. In some embodiments, the coating layer can restore the selectivity and permeability of the membrane to the intrinsic values of a defect-free membrane.

The coating layer can comprise a polymer. For example, the coating layer can comprise a polymer that is desirably chemically stable under the operating conditions. Suitable polymers that may be used include, but are not limited to, polysulphones, polyethersulphones, cellulose acetates, polyamides, polyimides, polypyrrolones, cross-linked polyimides, polyether ketones, polyetherether ketones, polyetherimides, silicone rubbers, nitrile rubbers, neoprene rubbers, silicones, polycarbonates, polyarylenes, polyphenylene ethers, polyolefin elastomers, polybutadienes, vinyl polymers, polyalkalyenes, fluoropolymers, polymeric organosilicones, combinations thereof, and copolymers thereof. In some embodiments, the coating layer can comprise a polymeric organosilicone. In some embodiments, the polymeric organosilicone can be polydimethylsiloxane (PDMS).

The total thickness of the membrane, as well as the thickness of each layer/sub-layer making up the membrane, can be chosen such that the structure is mechanically robust, but not so thick as to impair permeability. In some cases, the membranes disclosed herein can have a thickness of from 250 nanometers to 500 microns (e.g., from 250 nm to 5 microns, or from 250 nanometers to 2 microns, or from 250 nanometers to 1 micron).

In some embodiments, the gas permeable support can have a thickness of from 50 nanometers to 2 microns (e.g., from 50 nm to 1 micron, or from 100 nanometers to 750 nanometers, or from 250 nanometers to 500 nanometers). In some embodiments when the membrane includes a coating layer, the coating layer can have a thickness of from 50 nanometers to 5 microns (e.g., from 50 nm to 2 microns, or from 100 nanometers to 750 nanometers, or from 250 nanometers to 500 nanometers).

The membranes described herein can have a $CO_2:N_2$ selectivity of at least 10 at 24° C. and 1 atm feed pressure. For example, the membranes can have a $CO_2:N_2$ selectivity of at least 25 at 24° C. and 1 atm feed pressure (e.g., at least 50 at 24° C. and 1 arm feed pressure, at least 75 at 24° C. and 1 atm feed pressure, at least 100 at 24° C. and 1 atm feed pressure, at least 200 at 24° C. and 1 atm feed pressure, at least 250 at 24° C. and 1 atm feed pressure, at least 300 at 24° C. and 1 atm feed pressure, at least 350 at 24° C. and 1 atm feed pressure, or at least 400 at 24° C. and 1 atm feed pressure). In some embodiments, the membranes can have a $CO_2:N_2$ selectivity of 500 or less at 24° C. and 1 atm feed pressure. In certain embodiments, the membranes can have a $CO_2:N_2$ selectivity ranging from any of the minimum values described above to any of the maximum values described above. For example, in certain embodiments, the membranes can have a $CO_2:N_2$ selectivity of from 10 to 500 (e.g., from 75 to 350) at 24° C. and 1 atm feed pressure. The $CO_2:N_2$ selectivity of the membranes described can be measured using standard methods for measuring gas permeance known in the art, such as those described in the examples below. Unless otherwise specified, the $CO_2:N_2$ selectivity of the membranes is measured at 24° C. and 1 atm feed pressure.

Figures 19A, 19B, 19C, 19D:
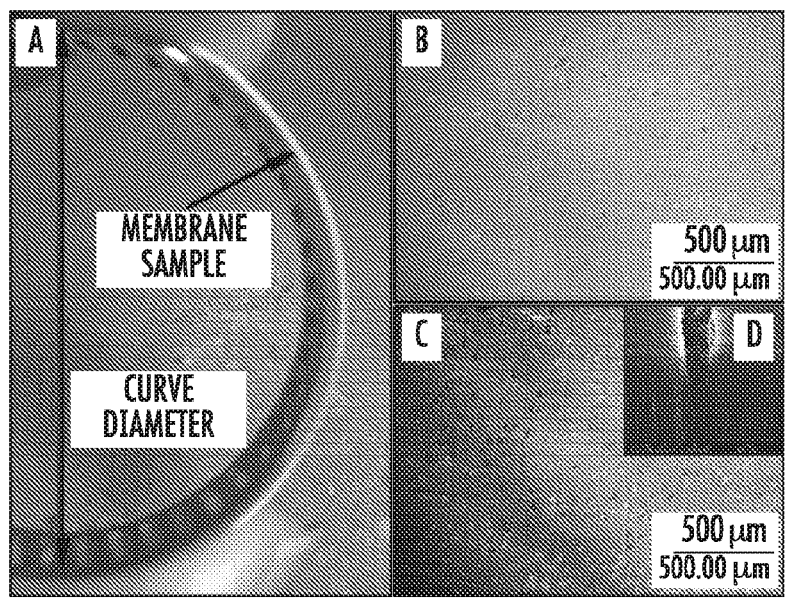
FIGS. 19A-19D show a bendability study diagram (19A), optical micro-scope of PDMS/M8 membrane before (19B) and after (19C) bending and SEM of membrane (19D).

The membrane can be bendable. For example, the membranes can be bendable such that they can be bent around a radius without damage to the membrane, such as cracks, holes, or other irregularities which can impair the separation performance of the membrane. For example, the membrane can be bendable, such that when the membranes are wrapped around a 1.5-inch diameter cylinder and returned to a planar conformation, the $CO_2:N_2$ selectivity of the membranes is at least 25% of the $CO_2:N_2$ selectivity (e.g., at least 30% of the $CO_2:N_2$ selectivity, at least 40% of the $CO_2:N_2$ selectivity, at least 50% of the $CO_2:N_2$ selectivity, at least 60% of the $CO_2:N_2$ selectivity, at least 70% of the $CO_2:N_2$ selectivity, at least 75% of the $CO_2:N_2$ selectivity, at least 80% of the $CO_2:N_2$ selectivity, at least 85% of the $CO_2:N_2$ selectivity, at least 90% of the $CO_2:N_2$ selectivity, or at least 95% of the $CO_2:N_2$ selectivity) of the membrane prior to having been wrapped around the cylinder. In some cases, the membrane can be bendable, such that when the membranes are wrapped around a 1-inch diameter cylinder and returned to a planar conformation, the $CO_2:N_2$ selectivity of the membranes is at least 25% of the $CO_2:N_2$ selectivity (e.g., at least 30% of the $CO_2:N_2$ selectivity, at least 40% of the $CO_2:N_2$ selectivity, at least 50% of the $CO_2:N_2$ selectivity, at least 60% of the $CO_2:N_2$ selectivity, at least 70% of the $CO_2:N_2$ selectivity, at least 75% of the $CO_2:N_2$ selectivity, at least 80% of the $CO_2:N_2$ selectivity, at least 85% of the $CO_2:N_2$ selectivity, at least 90% of the $CO_2:N_2$ selectivity, or at least 95% of the $CO_2:N_2$ selectivity) of the membrane prior to having been wrapped around the cylinder. In certain cases, the membrane can be bendable, such that when the membranes are wrapped around a 0.5-inch diameter cylinder and returned to a planar conformation, the $CO_2:N_2$ selectivity of the membranes is at least 25% of the $CO_2:N_2$ selectivity (e.g., at least 30% of the $CO_2:N_2$ selectivity, at least 40% of the $CO_2:N_2$ selectivity, at least 50% of the $CO_2:N_2$ selectivity, at least 60% of the $CO_2:N_2$ selectivity, at least 70% of the $CO_2:N_2$ selectivity, at least 75% of the $CO_2:N_2$ selectivity, at least 80% of the $CO_2:N_2$ selectivity, at least 85% of the $CO_2:N_2$ selectivity, at least 90% of the $CO_2:N_2$ selectivity, or at least 95% of the $CO_2:N_2$ selectivity) of the membrane prior to having been wrapped around the cylinder. The bendability of the membrane can be measured using standard methods for measuring bendability known in the art, such as those described in the examples below. In an example method, the membrane can be bent to fit onto a column with a curve diameter of 1.5 inch, as shown in FIG. 19. After bending, an optical microscope and gas transport measurement can be performed to characterize any damage caused by bending.

The membranes described herein can have a $CO_2$ permeance of at least 250 at 24° C. and 1 atm feed pressure. For example, the membranes can have a $CO_2$ permeance of at least 500 at 24° C. and 1 atm feed pressure (e.g., at least 750 at 24° C. and 1 atm feed pressure, at least 1000 at 24° C. and 1 atm feed pressure, at least 1500 at 24° C. and 1 atm feed pressure, at least 2000 at 24° C. and 1 atm feed pressure, at least 2500 at 24° C. and 1 atm feed pressure, at least 3000 at 24° C. and 1 atm feed pressure, at least 3500 at 24° C. and 1 atm feed pressure, or at least 4000 at 24° C. and 1 atm feed pressure). In some embodiments, the membranes can have a $CO_2$ permeance 5000 or less at 24° C. and 1 atm feed pressure. In certain embodiments, the membranes can have a $CO_2$ permeance ranging from any of the minimum values described above to any of the maximum values described above. For example, in certain embodiments, the membranes can have a $CO_2$ peremance of from 500 to 5000 (e.g., from 1000 to 5000, from 2000 to 5000, from 500 to 3000, from 500 to 2500, or from 1000 to 2500) at 24° C. and 1 atm feed pressure. The $CO_2$ peremance of the membranes described can be measured using standard methods for measuring gas permeance known in the art, such as those described in the examples below. Unless otherwise specified, the $CO_2$ peremance of the membranes is measured at 24° C. and 1 atm feed pressure.

Methods of Making Nanoparticles

Methods of making an alumino-silicate nanoparticles are also disclosed. Methods of making an alumino-silicate nanoparticles can comprise (a) heating a first mixture comprising a silicon source, an aluminum source, a base, an organic agent, and a first solvent to produce a first population of alumino-silicate nanoparticles dispersed in a first supernatant; (b) separating the first population of inorganic nanoparticles from the first supernatant; (c) adding a base to the first supernatant to form a second mixture; (d) heating the second mixture to produce a second population of alumino-silicate nanoparticles dispersed in a second supernatant; and (e) separating the second population of inorganic nanoparticles from the second supernatant. The first population of alumino-silicate nanoparticles and the second population of alumino-silicate nanoparticles prepared by the methods described herein can each have an average particle size of 100 nm or less.

Methods of making alumino-silicate nanoparticles can further include mixing a silicon source, an aluminum source, a base, an organic agent, and a first solvent to form a first mixture. The silicon and/or aluminum source can include any suitable compound that will hydrolyze to provide silicon and/or aluminum to form the framework of the alumino-silicate nanoparticle. For example, the silicon source can include tetraethylorthosilane (TEOS), colloidal or fumed silica (amorphous silica such as Ludox LS30), disodium metasilicate, or combinations thereof. The aluminum source can include aluminum hydroxide, aluminum isopropoxide, sodium aluminate, aluminum sulfate, or combinations thereof. The organic agent can be a porous material that can serve as the structure around which an alumino-silicate nanoparticles can form. For example, the organic agent can be any suitable organic base. Examples of organic agents can include tetrapropyl ammonium hydroxide (TPAOH), tetramethyl ammonium hydroxide (TMAOH), tetramethyl ammonium bromide, and tetrapropyl ammonium bromide. The base can include transition metal oxides and hydroxides, alkali metal oxides and hydroxides, alkaline earth metal oxides and hydroxides. For example, the base can include sodium hydroxide or potassium hydroxide. The first solvent can include water.

In some embodiments, the first mixture can comprise water, sodium hydroxide, colloidal silica, tetramethyl ammonium hydroxide, aluminum isopropoxide, and tetramethylammonium bromide. In some embodiments, the first mixture can comprise water, sodium hydroxide, tetraethylorthosilane, and tetrapropyl ammonium hydroxide. In some embodiments, the first mixture can comprise water, tetraethylorthosilane, sodium hydroxide, tetramethyl ammonium hydroxide, and aluminum isopropoxide. In some embodiments, the first mixture can comprise water, sodium hydroxide, tetrapropyl ammonium hydroxide, silicon, and ethanol.

The amount of silicon source present in the first mixture can be from 1.7 mol % to 5.2 mol % (e.g., from 3.1 mol % to 3.8 mol %) of the components used to form the first mixture. The amount of aluminum source present in the first mixture can be from 0.01 mol % to 2 mol % (e.g., from 0.02 mol % to 1 mol %) of the components used to form the first mixture. The amount of organic agent present in the first mixture can be from 0.1 mol % to 5 mol % (e.g., from 0.6 mol % to 0.3 mol %) of the components used to form the first mixture. The amount of base present in the first mixture can be from 0.001 mol % to 0.1% mol % (e.g., from 0.0001 mol % to 0.05 mol %) of the components used to form the first mixture. The amount of solvent present in the mixture can be from 90 mol % to 99 mol % (e.g., from 95 mol % to 99 mol %) of the components used to form the first mixture.

In an example method, the silicon source, aluminum source, base, organic agent, and solvent can be combined in a suitable ratio to form a first mixture comprising 0.048 $Na_2O$:2.40 $(TMA)_2O(2OH)$: 1.2 $(TMA)_2O(2Br)$: 4.35 $SiO_2$: 1.0 $Al_2O_3$:249 $H_2O$, after hydrolysis.

The first mixture comprising the silicon source, aluminum source, base, organic agent, and solvent can be stirred and heated at a suitable temperature, for a sufficient time for hydrolysis of the silicon and/or aluminum sources. In some embodiments, the first mixture can be initially mixed and aged at room temperature with stirring. The duration of aging can be 12 hours or greater (e.g., 18 hours or greater, 24 hours or greater, 30 hours or greater, or 36 hours or greater). The aged mixture can be heated to a temperature of from 50° C. to 150° C. (e.g., 60° C. or greater, 75° C. or greater, 80° C. or greater, 90° C. or greater, 100° C. or greater, or from 80° C. to 150° C.). In some embodiments, the first mixture can be heated to the reflux temperature of the solvent. In some embodiments, heating can comprise irradiating the first mixture with microwave radiation.

The duration of heating can be 12 hours or greater (e.g., 18 hours or greater, 24 hours or greater, 30 hours or greater, 36 hours or greater, or 48 hours or greater). Once hydrolysis has occurred, an alumino-silicate gel comprising a first population of nanoparticles dispersed in a first supernatant can be formed. The first batch of alumino-silicate nanoparticles can be separated from the first supernatant (e.g., by centrifugation). In some examples, low speed centrifugation can be used to remove impurities and/or large aluminosilicate particles and high speed centrifugation can be used to remove alumino-silicate nanoparticles from the first supernatant.

The method can include using the first supernatant obtained from hydrothermal synthesis of the first population of alumino-silicate nanoparticles to synthesize additional populations of alumino-silicate nanoparticles. For example, the method can include adding additional base to the first supernatant to form a second mixture. The amount of base added to the first supernatant can be about 0.001 mol % to about 0.1% mol %, of the starting materials used to form the mixture.

The second mixture can be aged and heated for a sufficient time and at an appropriate temperature to produce a second population of alumino-silicate nanoparticles dispersed in a second supernatant. The duration of aging can be 12 hours or greater. The aged mixture can be heated with stirring for 2 hours or greater (e.g., 3 hours or greater, 4 hours or greater, 5 hours or greater, or 6 hours or greater), to form the second population of alumino-silicate nanoparticles dispersed in the second supernatant. In some embodiments, heating can comprise irradiating the second mixture with microwave radiation. The second population of alumino-silicate particles can be separated from the second supernatant (e.g., by centrifugation).

The steps of adding a base to form a mixture and aging/heating the mixture to form a population of nanoparticles dispersed in a supernatant can be defined as a cycle. The cycle can be repeated multiple times to prepare multiple populations of nanoparticles (e.g., large quantities of nanoparticles). In some embodiments, the cycle can be repeated at least 2 times (e.g., at least 3 times, at least 4 times, at least 5 times, at least 6 times, at least 7 times, at least 8 times, or more than 8 times) to increase the yield of alumino-silicate nanoparticles. In some embodiments, the cycle can be repeated until the yield of the second population of alumino-silicate nanoparticles is at least 75% (e.g., at least 80%, at least 85%, at least 90%, or at least 95%).

If desired, step (e) can be performed after each cycle (e.g., the population of nanoparticles can be separated after each cycle). In certain embodiments, the cycle can be repeated multiple times prior separating the nanoparticles (e.g., steps (c) and (d) can be repeated multiple time prior to performing step (e)). For example, in some embodiments, steps (c) and (d) can be repeated at least 5 times prior to performing step (e). In certain embodiments, steps (c) and (d) can repeated until the yield of the second population of alumino-silicate nanoparticles is at least 75%, at which point step (e) can be performed.

In one example method of preparing alumino-silicate nanoparticles, Ludox HS-30 and tetramethylammonium hydroxide can be mixed at room temperature to produce a silicon source. Aluminum isopropoxide can be dissolved in water and tetramethylammonium hydroxide. The resulting mixture can be heated followed by addition of tetramethylammonium bromide, thereby forming the aluminum source. The silicon source and aluminum source can be mixed and aged at room temperature with stirring for about three days. The aged mixture can be heated with stirring for about four days. The reacted mixture can be centrifuged to produce zeolite Y nanoparticles and a supernatant. The supernatant can be mixed with sodium hydroxide, aged overnight, and refluxed for about 3 hours to produce a second batch of zeolite Y nanoparticles and a second supernatant. The second batch of zeolite Y nanoparticles can be separated from the supernatant. The addition of sodium hydroxide, aging, heating, and separating the nanoparticles from the supernatant can define one cycle. The cycle can then be repeated eight times.

In some embodiments, the heating step(s) in the methods described above can include heating, concentrating, and diluting the second mixture. Heating the mixture can be carried out simultaneously with concentrating the mixture. Concentrating the mixture can include removing a portion of solvent, such as by heating the mixture to a sufficient temperature for evaporation of a portion of the solvent. The portion of solvent removed from the mixture can be from about 20% to about 70%, by volume of the solvent originally present in the mixture. For example, about 50% by volume of the solvent can be removed from the mixture within about 30 minutes to about 120 minutes, to form a concentrated mixture.

Diluting the mixture can be carried out simultaneously with heating, but subsequent to concentrating the mixture. Diluting the concentrated mixture can include adding a portion of solvent to the concentrated mixture. The portion of solvent added to the concentrated mixture can be from about 20% to about 70%, by volume of the solvent originally present in the mixture. For example, about 50% by volume of the solvent originally present in the mixture, can be added to the concentrated mixture within about 30 minutes to about 120 minutes. In some embodiments, the amount of solvent removed during concentrating the mixture can be the same amount added to the concentrated mixture during the dilution step.

In desired, the steps of concentrating the mixture and diluting the concentrated mixture can be repeated, without separating the nanoparticles formed from the mixture. In some embodiments, the step of concentrating the mixture and diluting the concentrated mixture can be repeated at least 2 times (e.g., at least 3 times, at least 4 times, at least 5 times, at least 6 times, at least 7 times, at least 8 times, or more than 8 times).

In one example method of preparing alumino-silicate nanoparticles, Ludox HS-30 and tetramethylammonium hydroxide can be mixed at room temperature to produce a silicon source. Aluminum isopropoxide can be dissolved in water and tetramethylammonium hydroxide. The resulting mixture can be heated to form a solution followed by addition of tetramethylammonium bromide resulting in the aluminum source. The silicon source and aluminum source can be mixed and aged at room temperature with stirring for about three days. The aged mixture can be heated with stirring for about four days. The reacted mixture can be centrifuged to produce zeolite Y nanoparticles and a supernatant. The supernatant can be mixed with sodium hydroxide, refluxed, and concentrated by removing water (by condensation) for about 30 minutes during reflux. The resulting concentrated solution can be refluxed for an additional 30 minutes. Sodium hydroxide can be dissolved in the condensed water which can be used to dilute the concentrated solution. The water can be added to the concentrated solution over about 30 minutes. The 90 minutes process can define one cycle. The cycle can be repeated for six times (9 hours) to form zeolite Y nanoparticles.

In some embodiments, zeolite nanoparticles can be prepared from the methods of preparing alumino-silicate nanoparticles, described herein. The zeolite nanoparticles can include zeolite Y nanoparticles.

The nanoparticles produced by the methods described above can have any suitable size and shape. For example, the nanoparticles can be spherical, cylindrical, or rod-like. In some embodiments, the nanoparticles can have an average particle size of less than 1 micron (e.g., less than 750 microns, less than 500 microns, less than 250 microns, less than 200 microns, less than 150 microns, less than 100 microns, less than 50 microns, or less than 25 microns). In some embodiments, the nanoparticles can have an average particle size of at least 1 nm (e.g., at least 5 nm, at least 10 nm, at least 15 nm, or at least 25 nm). The nanoparticles can have an average particle size ranging from any of the minimum values described above to any of the maximum values described above. For example, in certain embodiments, the nanoparticles can have an average particle size of from 1 nm to 200 nm (e.g., from 1 nm to 150 nm, from 1 nm to 100 nm, or from 1 nm to 50 nm). The term "average particle size," as used herein, generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Mean particle size can be measured using methods known in the art, such as dynamic light scattering or electron microscopy.

In some embodiments, the populations of nanoparticles comprise populations of nanoparticles having a monodisperse particle size distribution. The term "monodisperse," as used herein, describes a population of nanoparticles where all of the nanoparticles are the same or nearly the same size. As used herein, a monodisperse particle size distribution refers to particle distributions in which 80% of the distribution (e.g., 85% of the distribution, 90% of the distribution, or 95% of the distribution) lies within 20% of the median particle size (e.g., within 15% of the median particle size, within 10% of the median particle size, or within 5% of the median particle size).

Methods of Making Membranes

Methods of making the membranes described herein are also disclosed herein. Methods of making a membrane can comprise (a) heating an alumino-silicate growth solution comprising a silicon source, an aluminum source, a base, and a first solvent; (b) concentrating the alumino-silicate growth solution; (c) contacting a porous gas permeable support with the alumino-silicate growth solution, wherein the gas permeable support further comprises a population of alumino-silicate seed particles disposed within the gas permeable support; and (d) diluting the alumino-silicate growth solution. The gas permeable support can remain in contact with the alumino-silicate growth solution for a period of time effective to form a continuous phase comprising an alumio-silicate disposed within the gas permeable support. In some embodiments, steps (a) to (d) are carried out over a period of two hours or less. In certain embodiments, the method can used in a continuous roll-to-roll process to prepare alumino-silicate membranes.

Methods can further include preparing the gas permeable support comprising a population of alumino-silicate seed particles disposed within the gas permeable support (also referred to herein as a seeded gas permeable support). The population of alumino-silicate seed particles can comprise a plurality of discreet nanoparticles having an average particle size of less than 1 micron (e.g., less than 750 microns, less than 500 microns, less than 250 microns, less than 200 microns, less than 150 microns, less than 100 microns, less than 50 microns, or less than 25 microns).

The population of alumino-silicate seed particles can be dispersed within the porous gas permeable support using an alumino-silicate nanoparticle dispersion. The alumino-silicate nanoparticle dispersion can comprise a population of alumino-silicate seed particles dispersed in a fluid carrier (e.g., a solvent such as water).

The population of alumino-silicate seed particles can be dispersed in the gas permeable support using a vacuum-assisted dip-coating. By way of example, the population of alumino-silicate seed particles can be dispersed in water via ultrasonication. During sonication, the water can be changed intermittently to prevent a temperature rise. The nanoparticle dispersion can then be deposited within the gas permeable support using a vacuum-assisted dip-depositing set-up, which is shown schematically in FIG. 20. In this set-up, there is a circular or rectangular holder with a hollow handle connected to a Duoseal 1405 liquid ring vacuum pump. The holder has evenly placed grooves for uniform distribution of the vacuum. A porous base, such as a metal plate is held on the holder by the vacuum. The gas permeable support can be fixed and flattened on the metal plate by both tape and vacuum. The top surface of a gas permeable support can then be dipped tangentially (as in crossflow filtration) into the dispersion of alumino-silicate seed particles and then taken out. The vacuum in addition to assisting the layer formation helps to keep the support flat during the deposition process. After the deposition, the gas permeable support can be dried overnight at room temperature prior to further characterization. The gas permeable layer can be characterized using standard methods (e.g., scanning electron microscopy (SEM) and/or dynamic light scattering) to assess deposition of the seed particles. Pretreatment of the gas permeable support can be used to remove water or other adsorbed species using methods appropriate to the support and the adsorbate. Examples of absorbed species are, for example, water, alcohols, porogens, and surfactant templates.

The gas permeable support can comprise from 0.00005 wt % to 2.5 wt % (e.g, 0.00005 wt % or greater, 0.0005 wt % or greater, 0.005 wt % or greater, 0.05 wt % or greater, 0.06 wt % or greater, 0.07 wt % or greater, 0.08 wt % or greater, 0.09 wt % or greater, from 0.05 wt % to 1.5 wt %, from 0.75 wt % to 1.25 wt %, or from 0.08 wt % to 1.2 wt %) alumino-silicate seed particles, based on the total weight of the gas permeable membrane (including the seed particles). In some embodiments, the alumino-silicate seed particles are present in the gas permeable support in an amount less than 1.5 wt %, based on the total weight of the gas permeable support (including the seed particles) (e.g., less than 1 wt %, less than 0.5 wt %, less than 0.1 wt %, less than 0.05 wt %, less than 0.01 wt %, less than 0.005 wt %, less than 0.001 wt %, or less). In some embodiments, the gas permeable support can comprise about 0.0001 wt % alumino-silicate seed particles, based on the total weight of the gas permeable membrane (including the seed particles).

Methods can further include preparing an alumino-silicate growth solution. The alumino-silicate nanoparticle growth solution can be prepared by mixing a silicon source, an aluminum source, a base, and a solvent to form the alumino-silicate growth solution. Examples of silicon sources can include colloidal or fumed silica (amorphous silica, such as Ludox LS30), disodium metasilicate ($Na_2O_3Si$), or combinations thereof. Examples of aluminum sources can include aluminum hydroxide, aluminum isopropoxide, sodium aluminate ($AlNaO_2$), aluminum sulfate ($Al_2O_{12}S_3$), or combinations thereof. The base can include a transition metal oxide and/or hydroxide, an alkali metal oxide and/or hydroxide, an alkaline earth metal oxide and/or hydroxide, or combinations thereof. For example, the base can include sodium hydroxide or potassium hydroxide. The solvent can include water.

In one example method of preparing a alumino-silicate growth solution disclosed herein, a solution of $H_2O$, $Al(OH)_3$ and NaOH can be mixed with Ludox SM-30. The resulting mixture can be aged for a sufficient period of time at room temperature to form a gel. The aging time can be two hours or greater. In some embodiments, the gel composition can comprise 17 $Na_2O$:1 $Al_2O_3$:21.80 $SiO_2$:975 $H_2O$.

Methods can comprise steps to elicit rapid growth of inorganic nanoparticles, including heating the alumino-silicate growth solution, concentrating the growth solution, and diluting the growth solution. The alumino-silicate growth solution can be heated by any suitable means, for example, using a microwave. The alumino-silicate nanoparticle growth solution can be heated to the reflux temperature of the solvent. For example, the alumino-silicate nanoparticle growth solution can be heated to about 100° C. for from about 30 minutes to about 120 minutes.

Concentrating the alumino-silicate growth solution can be carried out simultaneously with heating the growth solution.

Concentrating the alumino-silicate growth solution can include removing a portion of solvent from the growth solution. The portion of solvent removed can be from about 20% to about 70%, by volume of the solvent originally present in the growth solution. For example, about 50% by volume of the solvent can be removed from the alumino-silicate nanoparticle growth solution within about 30 minutes to about 120 minutes. In some embodiments, the amount of solvent removed and the duration of concentrating can depend on reaching the desired cloudiness which would indicate extensive nucleation of the alumino-silicate growth solution. As the solution becomes nucleated, the alumino-silicate growth solution becomes increasingly cloudy.

Diluting the alumino-silicate growth solution can be carried out simultaneously with heating the growth solution, and subsequent to concentrating the growth solution. Diluting the alumino-silicate growth solution can include adding a solvent to the alumino-silicate nanoparticle growth solution. The amount of solvent added to the growth solution can be from about 20% to about 70%, by volume of the solvent originally present in the alumino-silicate nanoparticle growth solution. For example, the amount of solvent added can be about 50%, by volume of the solvent initially present in the alumino-silicate nanoparticle growth solution. The solvent can be added within about 30 minutes to about 120 minutes, while heating. In some embodiments, the amount of solvent removed during concentrating the alumino-silicate nanoparticle growth solution can be the same amount added to the growth solution during the dilution step. The amount of solvent added and the duration of diluting can depend on reaching the desired growth of alumino-silicate particles within the gas permeable membrane.

The seeded gas permeable support can be contacted with the alumino-silicate growth solution during the course of one or more of the steps performed to elicit rapid growth of inorganic nanoparticles. For example, the seeded gas permeable support can be contacted with the alumino-silicate growth solution throughout the course of heating, concentrating, and diluting the alumino-silicate growth solution. For example, the seeded gas permeable support can be contacted with the alumino-silicate growth solution prior to heating, and maintained in contact with the alumino-silicate growth solution through the completion of the diluting step. In some embodiments, the seeded gas permeable support can be contacted with the growth solution after heating the solution such as, during concentrating the growth solution or after concentrating the growth solution. In certain embodiments, the seeded gas permeable support can be contacted with the inorganic nanoparticle growth solution during the step of diluting the growth solution.

In one example method of preparing a membrane disclosed herein, a solution of water, Al(OH)$_3$ and NaOH can be mixed with Ludox SM-30 to form a growth solution. The resulting mixture is aged for about four hours at room temperature. About half the added water can be removed from the formed gel composition during 1 hour of heating under reflux. The seeded gas permeable support can be introduced in the flask after dehydrating (water removal) the gel. During the next hour still under reflux, the portion of water removed can be added back to the gel to form a membrane as described herein.

The methods can further include forming the coating layer on the membrane. For example, in the case of coating layers formed from polymers, a casting solution comprising the polymer can be cast onto the membrane using any suitable casting techniques including, but not limited to, "knife casting", "dip casting", or "spin coating". Knife casting include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip casting include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc.

If desired for membrane performance, an additive may be included in the material forming the coating layer (e.g., in the polymer forming the coating layer) before forming the coating layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments membranes described herein can be formed over a period of from 2 hours to 36 hours. In other embodiments, the membranes described herein can be formed over a period of two hours or less. In some embodiments, the method of making the membrane can be scaled to industrial levels. For example, the method can be used in a continuous roll-to-roll process for preparing alumino-silicate membranes. In other embodiments, the method can be used in a planar process for preparing alumino-silicate membranes.

Methods of Using

The membranes disclosed herein can be used for separating a fluid mixture. In some embodiments, the membranes can be used for separating a gaseous mixture comprising a first gas and a second gas. For example, the membranes can be used to separate an acidic gas from a gaseous mixture containing at least one acidic gas. Methods of using the membrane can include contacting the membrane (e.g., on the side comprising the coating layer when present) with the gaseous mixture under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, or combinations thereof. In some embodiments, the membrane can be selective to hydrogen sulfide versus hydrogen, nitrogen, or combinations thereof. In some embodiments, the membrane can be selective to hydrochloric acid gas versus hydrogen, nitrogen, or combinations thereof. In some embodiments, the acid gas may be derived from fossil fuels that require hydrogen purification for fuel cell, electricity generation, and hydrogenation applications, biogas for renewable energy, and natural gas for commercial uses. The membranes can also be used for removal of carbon dioxide from flue gas.

The permeance of the first gas or the acid gas can be at least 50 GPU at 24° C. In some embodiments, the permeance of the first gas or the acid gas through the membranes can be up to 3,000 GPU at 24° C. For example, the permeance of the first gas or the acid gas through the membranes can be 50 GPU or greater, 100 GPU or greater, 150 GPU or greater, 200 GPU or greater, 500 GPU or greater, 1,000 GPU or greater, 1,500 GPU or greater, or 2,000 GPU or greater at 24° C. The membrane can exhibit a first gas:second gas selectivity of at least 10 at 24° C. In some embodiments, the membrane can exhibit a first gas:second gas selectivity of up to 500 at 24° C. For example, the membrane can exhibit a first gas:second gas selectivity of 10 or greater, 50 or greater, 100 or greater, 150 or greater, 200 or greater, 250 or greater, 300 or greater, or 350 or greater at 24° C. In some embodiments, the permeance and selectivity of the membrane for the first gas or the acid gas can vary at higher or lower temperatures.

In some embodiments, the membranes can be used for separating a liquid mixture comprising a first liquid and a second liquid. For example, the membranes can be used to separate a first liquid from a liquid mixture containing two or more miscible liquids or two or more immiscible liquids. Methods of using the membrane can include contacting the membrane (e.g., on the side comprising the coating layer when present) with the liquid mixture under conditions effective to afford transmembrane permeation of the first liquid. In some embodiments, the method can also include withdrawing from the reverse side of the membrane a permeate containing at least the first liquid, wherein the first liquid is selectively removed from the liquid stream.

The first liquid can include an aqueous or organic liquid. For example, the first liquid can be water; an alcohol such as methanol, ethanol, or propanol; a ketone such as acetone or methyl ethyl ketone; a hydrocarbon such as toluene, xylene, or decalin; a halogenated hydrocarbon such as carbon tetrachloride or dichloromethane; a nitrile such as acrylonitrile; a polar organic liquid such as ethylene glycol or polyethylene glycol; or combinations thereof. The liquid mixture can be an aqueous liquid mixture, an organic liquid mixture, or combinations thereof. For example, the liquid mixture can be a water-methanol mixture, a water-ethanol mixture, a water-acetone mixture, a methanol-ethanol mixture, a methanol-acetone mixture, or combinations thereof.

The membrane can be used to separate fluids at any suitable temperature, including temperatures of 100° C. or greater. For example, the membrane can be used at temperatures of from 100° C. to 180° C. In some embodiments, the membrane can be used at temperatures less than 100° C.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Methods for Rapid Synthesis of Non-aggregated Nanocrystalline Zeolites and Fabrication of Bendable Zeolite Membranes Microwave Synthesis of Zeolite Particles Using Initial Aged Clear Solution Composition: A clear solution composition containing 0.048 $Na_2O$:2.40 $(TMA)_2O(2OH)$: 1.2 $(TMA)_2O(2Br)$:4.35 $SiO_2$: 1.0 $Al_2O_3$:249 $H_2O$ ("Composition A") was aged for 24 hours. This solution was heated in a microwave oven at 200 W for 2.5 hours. Both zeolite Y and zeolite A were produced. Zeolite A are large particles, which was removed by low-speed centrifuge (FIG. 1; XRD labeled as Microwave). Pure zeolite Y was obtained with high speed centrifugation of the supernatant, with particle size of ~70 nm (FIG. 1; labeled as MW-purified).

Figure 2:
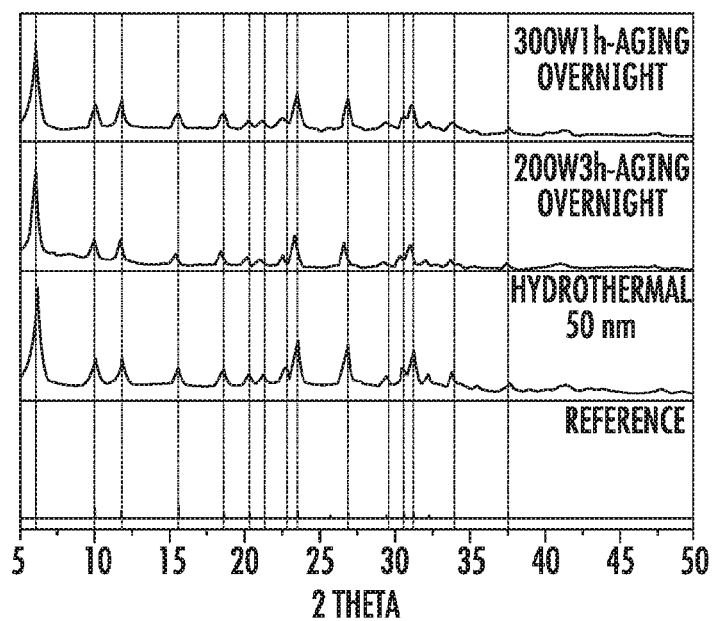
FIG. 2 shows X-ray diffraction of nanozeolite synthesized from supernatant with microwave irradiation.

Synthesis of Zeolite Particles from Supernatant Obtained after Hydrothermal Synthesis: Single Step: Hydrothermal synthesis using composition A was carried out at 100° C. for 24 hours. The resulting mixture was subjected to high speed centrifugation, yielding zeolite Y nanocrystals (yield 1-10%, size 37 nm). The supernatant was mixed with NaOH, aged overnight and heated in a microwave oven at different powers (300 W 1 h, 200 W 3 h). The resulting reactant mixture was subjected to high speed centrifugation, and zeolite nanocrystals were recovered (size 38 nm, yield %). The XRD of nanozeolite synthesized from the supernatant is shown in FIG. 2.

Figure 3:
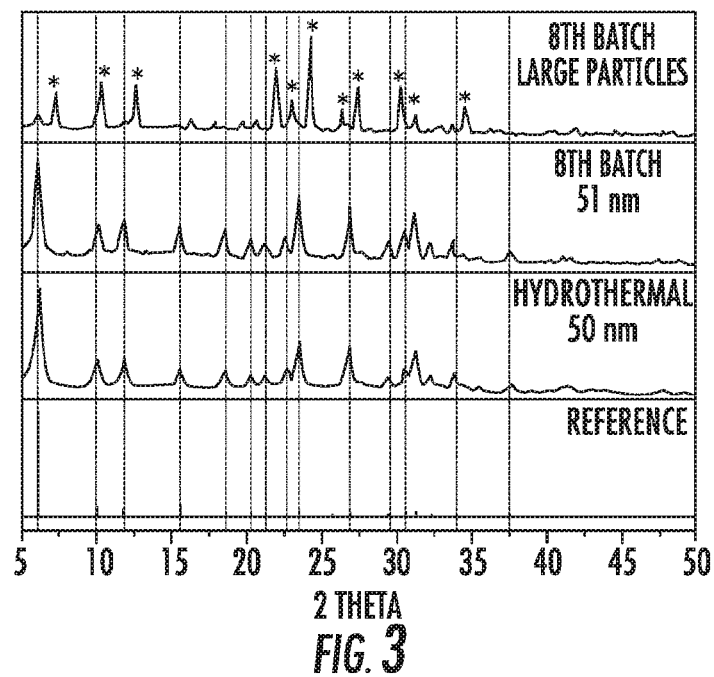
FIG. 3 shows X-ray diffraction of the eight batch of nanozeolite synthesized from supernatant using a multiple-step method. The X-ray diffraction shows zeolite obtained from high speed and low speed centrifugation.

Synthesis of Zeolite Particles from Supernatant Obtained after Hydrothermal Synthesis: Multiple Steps: Hydrothermal synthesis using composition A was carried out at 100° C. for 24 hours. The resulting mixture was subjected to high speed centrifugation, yielding zeolite Y nanocrystals (yield 1-10%, size 37 nm). The supernatant was mixed with NaOH, aged overnight and heated in a microwave oven at 200 W for 3 hours. The suspension was centrifuged with a low speed centrifuge to remove large particles, followed by high speed centrifuge to remove the nanocrystal zeolite Y particles. The supernatant was recovered and the process repeated 8 times. The yield of nanozeolite particles is reported in Table 1, below shows the results for 3 different experiments. The XRD of high speed centrifuge nanozeolite Y and low speed centrifuge large particles from the 8th batch are shown in FIG. 3.

TABLE 1

| Zeolite nanoparticles obtained from multiple-step synthesis. | | | | | | |
|---|---|---|---|---|---|---|
| | Gel #1 | | Gel #2 | | Gel #3 | |
| | Size (DLS) | Yield | Size (DLS) | Yield | Size (DLS) | Yield |
| 1st batch (HT) | 50 nm | 1.5% | 50 nm | 1.5% | 50 nm | 1.5% |
| 2nd batch (MW) | 41.08 nm | 9% | 40.09 nm | 9% | 47.4 nm | 9% |
| 3rd batch (MW) | 39.98 nm | 9% | 34.76 nm | 9% | 37.51 nm | 9% |

TABLE 1-continued

Zeolite nanoparticles obtained from multiple-step synthesis.

| | Gel #1 | | Gel #2 | | Gel #3 | |
|---|---|---|---|---|---|---|
| | Size (DLS) | Yield | Size (DLS) | Yield | Size (DLS) | Yield |
| 4th batch (MW) | 40.06 nm | 9% | 43.47 nm | 9% | 40.64 nm | 9% |
| 5th batch (MW) | 41.08 nm | 9% | 39.09 nm | 9% | 36.32 nm | 9% |
| 6th batch (MW) | 39.95 nm | 9% | 37.90 nm | 9% | 39.25 nm | 9% |
| 7th batch (MW) | 44.58 nm | 9% | 39.24 nm | 9% | 51.8 nm | 7% |
| 8th batch (MW) | 51.03 nm | 7% | 47.06 nm | 4% | 52.38 nm | 4% |

Total yield on one set of gel is ~70%.

Figure 4:
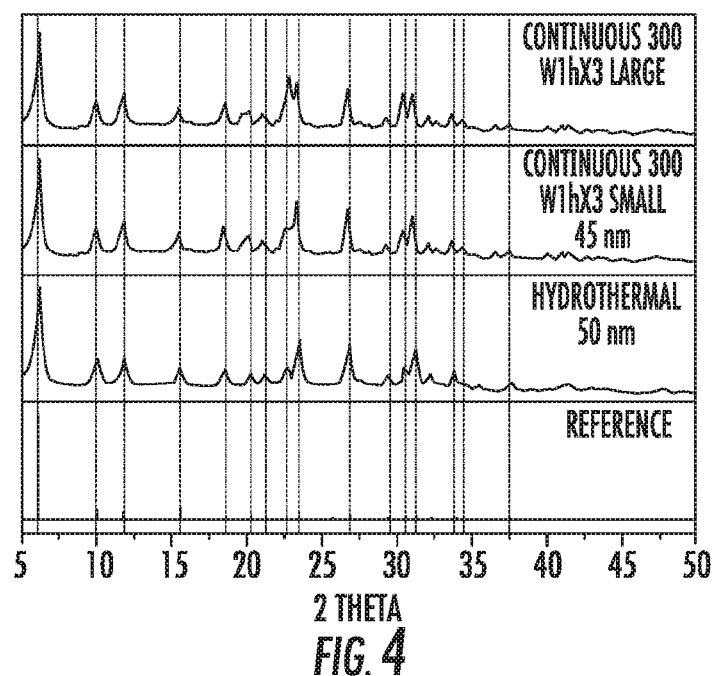
FIG. 4 shows X-ray diffraction of nanozeolite synthesized from supernatant using a continuous-step method.

Synthesis of Zeolite Particles from Supernatant Obtained after Hydrothermal Synthesis: Continuous Process: Hydrothermal synthesis using composition A was carried out at 100° C. for 24 hours. The resulting mixture was subjected to high speed centrifugation, yielding zeolite Y nanocrystals (yield 1-10%, size 37 nm). The supernatant was mixed with NaOH, sonicated for 5 minutes and microwaved for 1 hour at 300 W. Sodium hydroxide was added again, the mixture sonicated, and microwaved again. This cycle was repeated for 3 times without any centrifugation. After 3 cycles, the mixture was subjected to low speed centrifugation to remove large particles, followed by high speed centrifugation to recover nanozeolite Y particles. FIG. 4 shows the XRD of the purified zeolite particles. The total yield of nanozeolite Y was ~35%.

Figure 5:
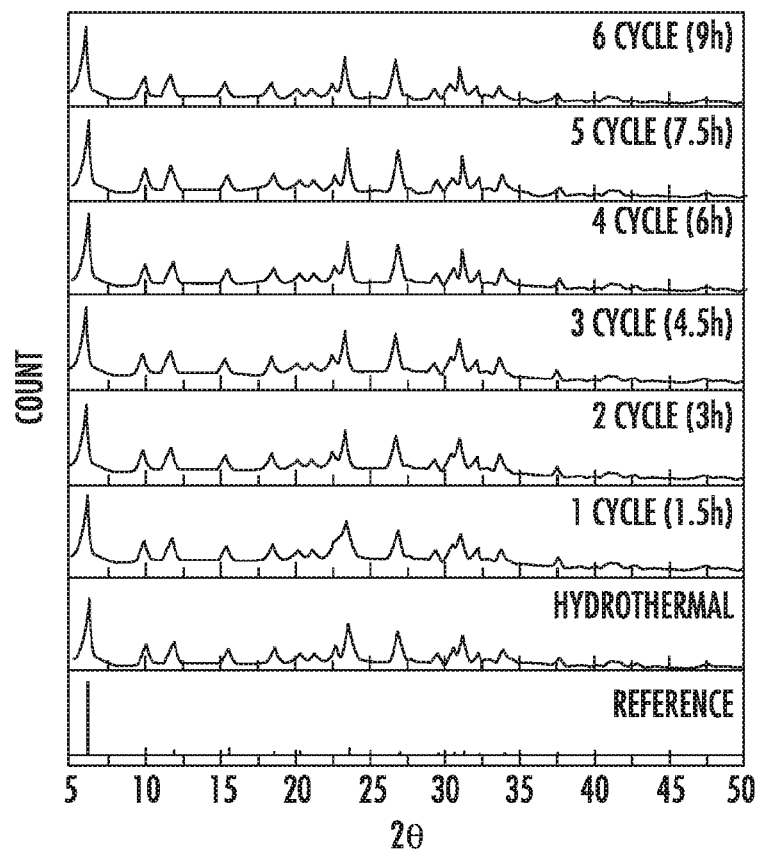
FIG. 5 shows X-ray diffraction of nanozeolite synthesized from supernatant using continuous dehydration-rehydration method.

Synthesis of Zeolite Particles from Supernatant Obtained after Hydrothermal Synthesis: Continuous Synthesis Using Dehydration-Rehydration Method: Hydrothermal synthesis using composition A was carried out at 100° C. for 24 hours. The resulting mixture was subjected to high speed centrifugation, yielding zeolite Y nanocrystals (yield 1-10%, size 37 nm). The supernatant was mixed with NaOH, refluxed, and water was removed for 0.5 hour during reflux. The concentrated solution was refluxed for 0.5 hour. NaOH was dissolved in the condensed water and was added back to the concentrated solution over 0.5 hour (this 1.5 hours process defines one cycle). The cycle was repeated for 6 times (9 hours) without any centrifugation. Sample aliquots were removed to measure the size of the particles and XRD. FIG. 5 shows the XRD from each cycle. The total yield of nanozeolite Y was 76%. Table 2 shows the results from the experiment.

TABLE 2

Zeolite nanoparticles obtained from continuous synthesis.

| Cycle | Particle size/nm | Yield/% |
|---|---|---|
| 1 | 32.7 | 10 |
| 2 | 38.5 | 27 |
| 3 | 42.2 | 36 |
| 4 | 47.9 | 51 |
| 5 | 54.4 | 66 |
| 6 | 60.5 | 76 |

Figures 6A, 6B:
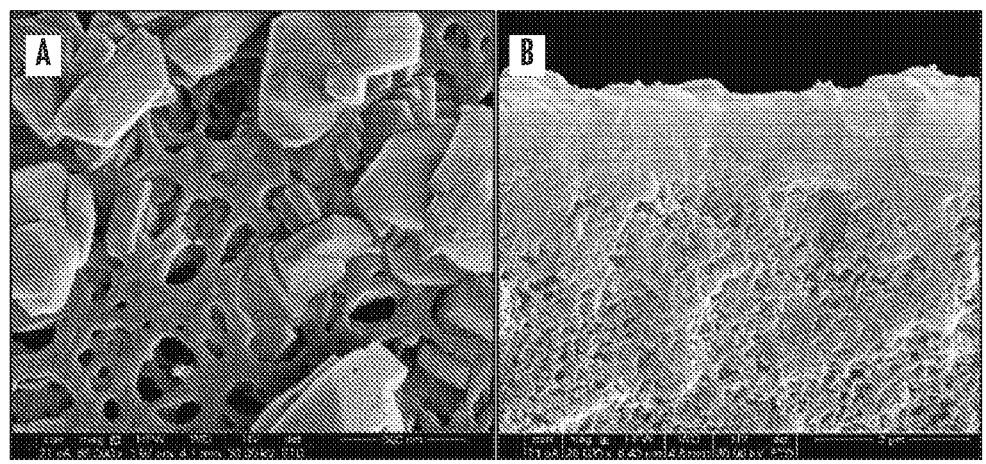
FIGS. 6A-6B are SEM images showing a top view (6A) and side view (6B) of bendable zeolite membrane.

Synthesis of Bendable Zeolite Membrane: The nanozeolite Y particles were used as seeds in secondary growth of zeolite membrane by the dehydration-rehydration method as disclosed in Severance, M. et al., *Langmuir* 2014, 30:6929-6937. FIG. 6 shows SEMs of the bendable zeolite membrane.

Figure 7:
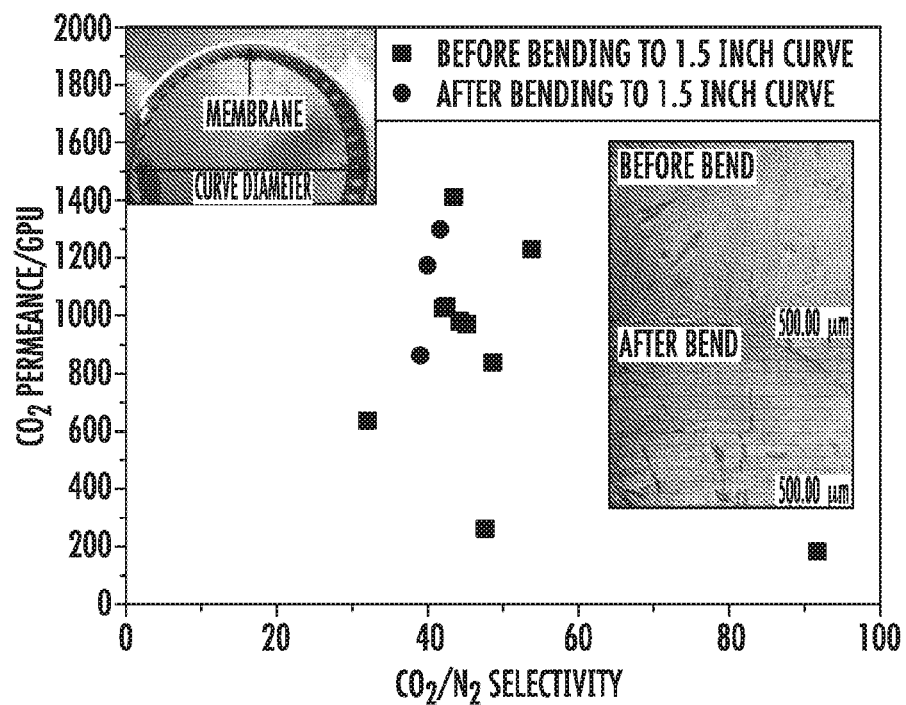
FIG. 7 is a plot showing the separation properties of bendable zeolite membranes.

Investigation of the $CO_2/N_2$ Separation Property of the Bendable Zeolite Membrane: The $CO_2/N_2$ separation property of the bendable zeolite membrane with PDMS cover layer was investigated. FIG. 7 shows the $CO_2/N_2$ selectivity and permeance of the membrane before and after bending. After bending to a 1.5 inch curve, the separation property was maintained.

Example 2

Rapid Synthesis of Faujasite/Polyethersulfone Composite Membrane and Application for $CO_2/N_2$ Separation Chemicals: Aluminum hydroxide ($Al(OH)_3$, 76.5%) was purchased from Alfa Aesar. Sodium hydroxide pellet from Fisher Scientific (NaOH, 99.0%) was used. Ludox SM-30 colloidal silica ($SiO_2$, 30%), Ludox HS-30 colloidal silica (SiO2, 30%) aluminum isopropoxide ($Al(O-CH(CH_3)_2)_3$, 98%) and tetramethylammonium bromide (($CH_3)_4NBr$), 98%) were purchased from Aldrich (Milwaukee. Wis., USA). Tetramethylammonium hydroxide (25% aqueous) was purchased from SACHEM Inc. All chemicals were used as received. Polyethersulfone (PES) 300 kDa supports were purchased from MILLIPORE Biomax. Water was purified by a Millipore ultrapure water system.

Zeolite Membrane Synthesis

Nanocrystalline Zeolite Y Seeds: Nanocrystalline zeolites with 40 nm diameter were synthesized using the procedure as described in Holmberg, B. et al. *Microporous Mesoporous Matter,* 2003, 59:13-28. Briefly, the gel composition was: 0.048 $Na_2O$:2.40 $(TMA)_2O(2OH)$: 1.2 $(TMA)_2O(2Br)$:4.35 $SiO_2$:1.0$Al_2O_3$:249 $H_2O$ (TMA is tetramethylammonium). The silicon source was obtained by mixing 26.2 g Ludox HS-30 and 10.46 g TMAOH in a Teflon bottle. The bottle was sealed with parafilm and stirred at room temperature for 30 min. The alumina source was obtained by dissolving 12.5 g aluminum isopropoxide in 76.5 g $H_2O$ and 52.3 g TMAOH at 70° C. in a hot bath until the suspension became clear. 11.3 g TMABr was added to the clear solution of the alumina source and the mixture stirred at room temperature for 15 min. The silicon source and aluminum source were mixed and aged at room temperature with stirring for 3 days, followed by heating at 100° C. in oil bath with stirring for 4 days. The product was isolated by dialysis and ultracentrifugation, followed by ion-exchange in 0.2 M NaCl solution for 2 hours. The ion exchanged product was washed with DI water and stored as a 1 wt % aqueous stock solution.

Zeolite Y Seed Layer: Zeolite Y seed layer on PES support was prepared with vacuum dip-coating. Before dip-coating, zeolite Y stock solution was placed in an ultrasonic bath for 1 hour and then diluted with DI water to the required concentration. Vacuum-assisted dip-coating involved evacuation of the PES support with zeolite seed dispersion on the top of the support for 3 seconds. The coated support was stored in a humidity chamber.

Zeolite Y Membrane Synthesis: The gel composition used for membrane growth was 17 $Na_2O$:1 $Al_2O_3$: 21.80 $SiO_2$: 975 $H_2O$, which was prepared by mixing a solution of 85.24 g $H_2O$, 2.208 g of $Al(OH)_3$ and 7.29 g NaOH with 13.85 g Ludox SM-30 followed by aging for 4 hours at room temperature. The opaque gel was moved to a round bottom flask to dehydrate. 40 mL of $H_2O$ was removed from the gel during 1 hour of heating under reflux. During the next hour still under reflux, 40 mL $H_2O$ was added back to the flask. The support was introduced in the flask in different stages during the synthesis, as described below.

PDMS Coated Zeolite Membrane: The zeolite was spin coated with 3.5 wt % polydimethylsiloxane (PDMS) monomer solution. PDMS monomer solution was prepared by adding PDMS monomer, crosslinker and catalyst in the ratio of 100:1:0.5 to heptane. For spin coating of PDMS onto a zeolite membrane, the membrane was first taped on the flat plate of the spin coater and PDMS monomer dispersion was added to cover the whole membrane. Spinning process consists of 2000 rpm spin for 5 s and then 4000 rpm spin for 1 min. After spin coating, the membrane was kept at room temperature overnight for PDMS to cross-link.

Characterization of Membrane

X-Ray Diffraction: A Bruker D8 X-Ray Diffractometer using CuKα (λ=1.5405 Å) radiation was used to characterize the phase composition of zeolite membranes.

Size and Zeta Potential: Size and zeta potential of nanocrystalline zeolite Y was characterized with Malvern Zetasizer.

Optical Microscope: Surface morphology of the membrane samples were studied with OLYMPUS PME3 optical microscope equipped with PAX cam.

Scanning Electron Microscopy: Membrane samples were cleaned and taped on SEM holder with conductive carbon paste and gold coated at 40 mA for 20 s before SEM characterization. Electron beam with 30 kV and 41 pA were typically used, and the voltage and current was adjusted. A FEI Helios Nanolab 600 Dual Beam Focused Ion Beam/Scanning Electron Microscope (FIB/SEM) was employed.

Mechanical Tape Test: Scotch tape was pushed onto the surface of membrane and then peeled off. The peeled tape and membrane were analyzed by SEM to study the mechanical stability of top layer of membranes.

Leak Test: A leak test (Kim, Y. et al., *J. Phys. Chem. C*, 2007, 111:10575-10581) was used to investigate the defects in the membrane samples. The membrane was placed in the middle of a glass cell with one side filled with ethanol and the other side filled with Rhodamine 6G-ethanol solution. By detecting the fluorescence of solution in cuvette over time, the dye leak through the membrane was studied. This test was done using a fluorimeter, Fluorolog from HORIBA.

Gas Transport Measurement: A gas separation setup was constructed. Feed gas and sweep gas compositions were controlled with a flow box and mass flow controllers from SIERRA Instruments Inc. Feed gas was introduced on the zeolite side of the membrane and sweep gas on the support side of the membrane. Permeate and retentate gas compositions were investigated with SRI 310C gas chromatography equipped with Hysep D column.

Results

Figures 8A, 8B:
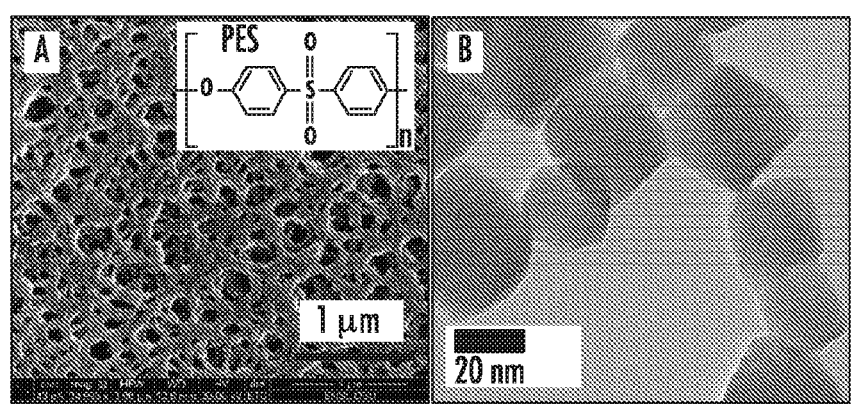
FIGS. 8A-8B are images showing SEM of PES support (8A) and TEM of nanozeolite Y particles (8B).

Zeolite Seed Deposition: The polymer support used was polyethersulfone with a 300 kDa molecular weight cut off, and is identified as PES support. FIG. 8A shows a top-view SEM of the support, with ~77 nm average pore size and ~15% porosity. Zeolite Y crystal of ~30-40 nm were used for seeding, and their morphology is shown in FIG. 8B. The zeolite seed coating was carried out by applying vacuum on the back side of PES membrane. The pH of the seed dispersion was varied as 2, 7 and 12 and the deposition was carried out with a seed loading of 0.09 wt %.

Figure 9:
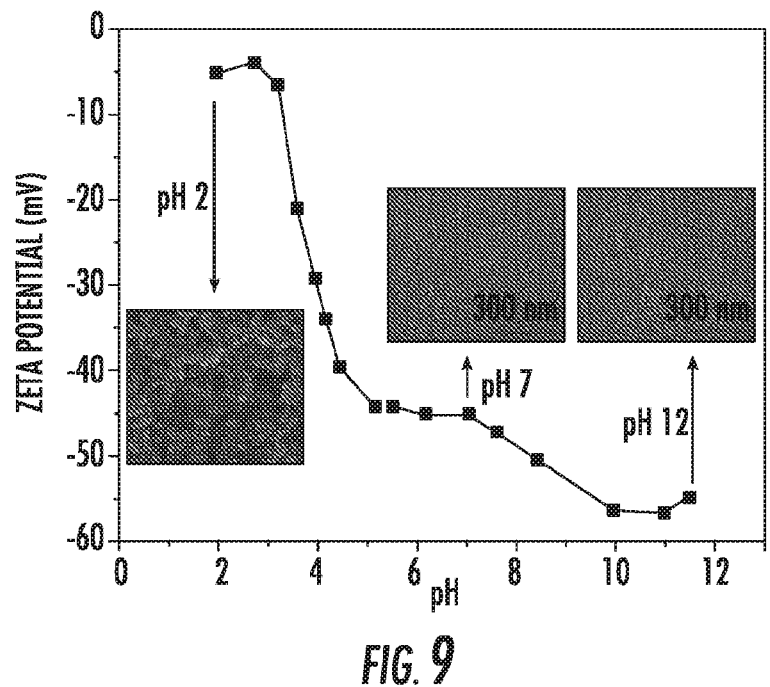
FIG. 9 is a plot showing the zeta potential—pH titration curve of nanozeolite Y particles and SEM of their deposition on PES support.

FIG. 9 shows the zeta potential—pH titration curve and the corresponding top-view SEM for the deposited samples. The zeta potential indicates that with lowering of pH, the surface charge, which is negative (~−55 mV) at pH ~12 tends towards more positive values. At pH 7, the zeta potential is −45 mV and at pH 2, it is −5 mV. From the SEM micrographs, it is clear that the optimum packaging of crystals on the PES surface occurs at pH ≥7. Thus, for all subsequent studies, vacuum-assisted seed deposition was carried out with the nanozeolite dispersion at pH ~7.

The amount of seed in the suspension was varied from 0.001 to 0.09 wt %, and from the top-view SEM (not shown), it was determined that the optimal loading based on the packing of the zeolite nanocrystals was at 0.09 wt %, and so all further studies are reported with this dispersion (pH ~7). With lower seed concentrations, the pores in the PES become visible.

Figures 10A, 10B:
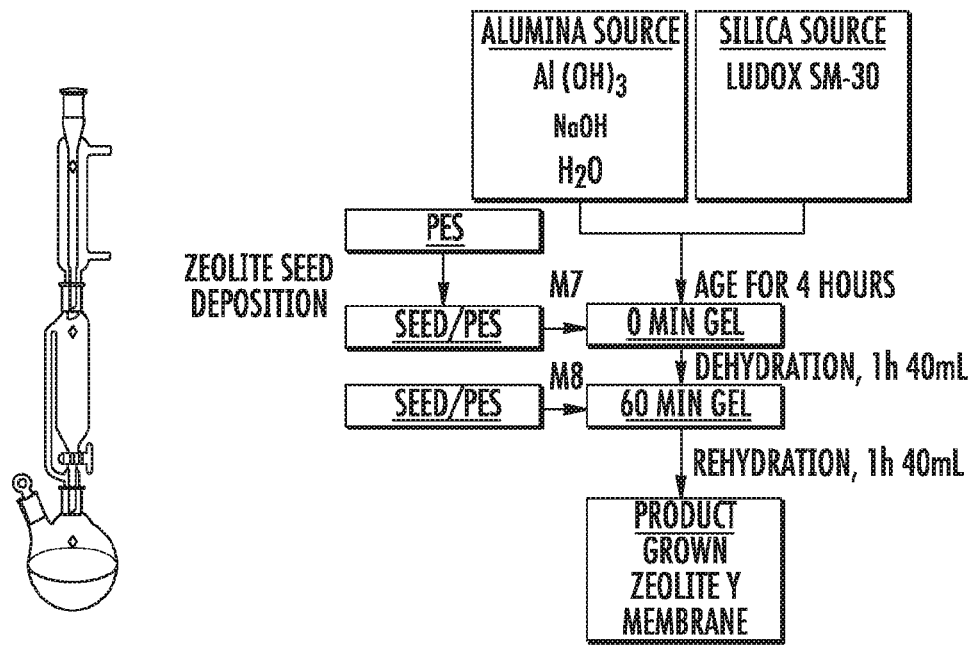
FIGS. 10A-10B are diagrams showing a reactor for zeolite membrane (10A) and the secondary growth procedure of zeolite membranes, M7 & M8 (10B).

Adapting Rapid Synthesis Method to Membrane Growth: FIG. 10 is a schematic of the synthesis apparatus and the procedure for rapid growth of zeolite Y. After aging the gel for 4 hours, it was loaded into a round bottomed flask with a condenser. During the first hour of reflux at ~100° C., about 40 mL of the water was removed from the flask into the dripper. The concentrated gel left behind in the flask was referred to as the 60 min-gel, and was isolated from the reaction medium and used for coating of the PES support. The 60 min-gel is heavily nucleated, and upon readdition of the water (under reflux condition), high quality faujasite crystals were formed within an hour. Eight different experiments were carried out, as outlined in Table 3. A sample holder was designed to hold the PES support flat during the hydro-thermal synthesis. The distance between the frame and the bottom is 3 mm, which prevents the PES from rolling up but does not hold the membrane too tightly.

TABLE 3

Secondary growth strategies of sample M1-M8 on PES 300 kDa support

| Sample Code | Support | Knife Casting Material | Secondary Growth Starts |
|---|---|---|---|
| M1 | Bare PES | Gel | After Dehydration |
| M2 | Bare PES | Gel/Seed | After Dehydration |
| M3 | Seed on PES | Gel | Before Dehydration |
| M4 | Seed on PES | Gel | After Dehydration |
| M5 | Seed on PES | Gel/Seed | Before Dehydration |
| M6 | Seed on PES | Gel/Seed | After Dehydration |
| M7 | Seed on PES | No Coating | Before Dehydration |
| M8 | Seed on PES | No Coating | After Dehydration |

Figures 11A, 11B, 11C, 11D, 11E, 11F, 11G, 11H:
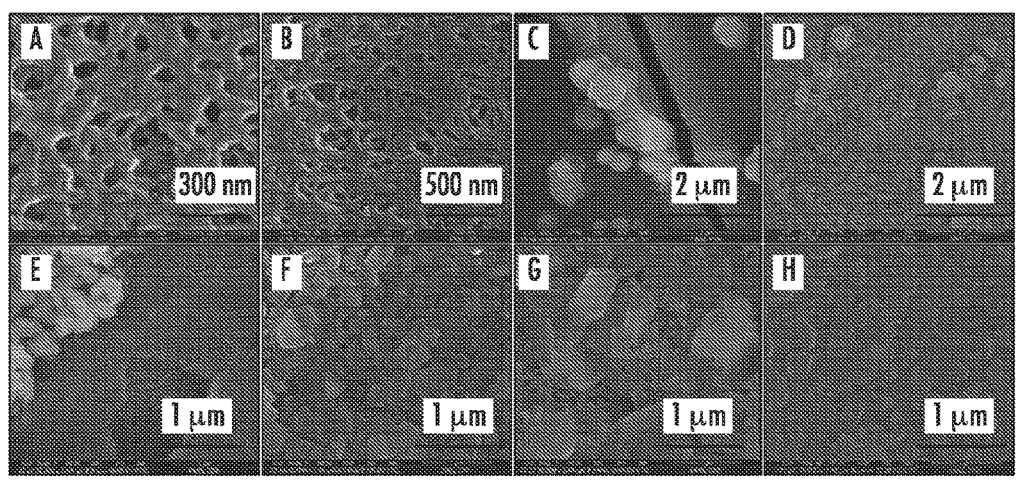
FIGS. 11A-11H are SEM images of the zeolite membranes M1 (11A), M2 (11B), M3 (11C), M4 (11D), M5 (11E), M6 (11F), M7 (11G), and M8 (11H).

Bare PES Support (M1, M2): The 60 min-gel was used as a coating on the PES supports, either by itself (M1) or with a physical mixture with the seeds (M2), applied using a knife casting method. Both M1 and M2 were introduced into the reactor by interrupting the reaction after the dehydration step and the reaction continued by dripping the water back under reflux conditions for an hour, and the samples isolated. FIGS. 11A and 11B shows a top view SEM of M1 and M2. There is no evidence of formation of a zeolite membrane.

Seeded PES Support: Six experiments were done with the seeded support shown in FIG. 9 (pH 7). For four of these, 60 min-gel (M3, M4) or a 60 min-gel plus seed (M5, M6) was knife cast on the seeded support. Two of these (M3, M5) were introduced into the reactor right from the start with the aged gel, and for one hour the water was withdrawn from the reaction and then during the second hour the water was added back, all under reflux conditions. FIGS. 11C and 11E shows the SEM of M3, M5, and membrane formation is incomplete. With the other two supports (M4, M6), they were introduced into the reactor after the 1-hour dehydration step, and while water was added back, the reflux continued for an hour, after which the samples were withdrawn. With both these samples (FIGS. 11D and 11F), the SEM shows that a membrane-like layer is formed on the support.

The final two experiments were done only with the seeded support introduced into the reactor from start (M7), and after 1-hour of dehydration (M8). For M7, the process was continued for two hours, one hour for removal of water and the second hour, the water was added back. For M8, the process took one hour, with the water being added back during the hour, while under reflux. FIGS. 11G and 11H show the SEM micrographs. With M7, the membrane layer is not uniform, and the pores of the PES support are evident. Thus, there were three cases M4, M6 and M8 that appeared to have a membrane layer on the PES support. We focused on the M8 membrane in this paper, since it did not require the extra step of knife casting of the gel, and its characteristics are detailed below.

Characteristics of M8 Membrane

Figures 12A, 12B, 12C, 12D:
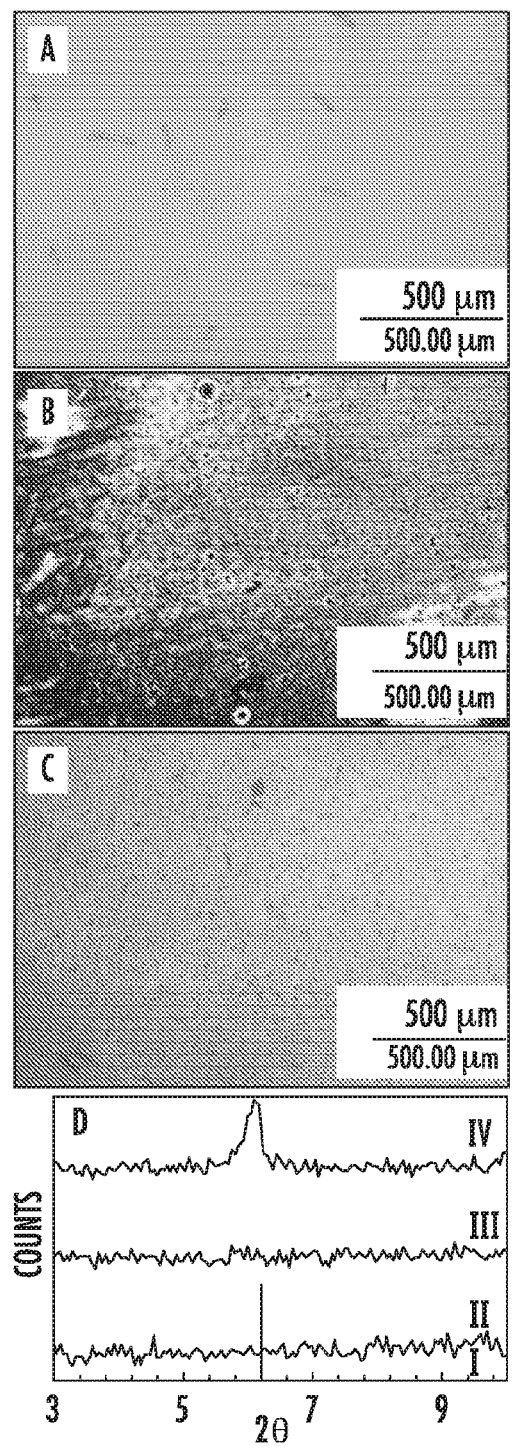
FIGS. 12A-12D shows optical microscopic images of bare PES support (12A), nanozeolite deposition on PES support (12B), zeolite membrane, M8 (12C), and XRD of zeolite Y reference (I), bare PES support (II), nanozeolite deposition (III) on PES support and zeolite membrane (IV) (12D).

Morphology: Optical micrographs provide a convenient way to estimate if there is growth on the PES support. FIGS. 12A, 12B, and 12C show the optical micrographs of the bare, seeded support and M8, respectively. The continuous color patterns on the seeded support and M8 are indicative of uniform deposition. Black dots shown in all 3 images are defects inherent to the PES support. As shown in FIG. 12D, M8 exhibits the characteristics (111) peak of faujasite at 2θ=6.4o, indicating formation of this framework.

Figures 13A, 13B, 13C:
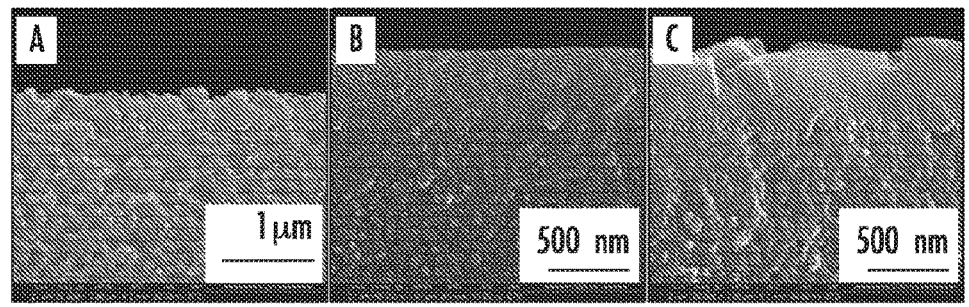
FIGS. 13A-13C are cross-section SEM images of bare PES support (13A), nanozeolite deposition on PES support (13B) and zeolite membrane, M8 (13C).

FIGS. 13A, 13B, and 13C show the cross-section SEM of a PES support, a seeded support and the M8 membrane. The seed layer is ~250-300 nm thick, and some of the nanozeolite seed crystals penetrate into the PES layer. With M8, there is clear densification of the seed layer into a continuous membrane, and the thickness is ~250-300 nm.

Figure 14:
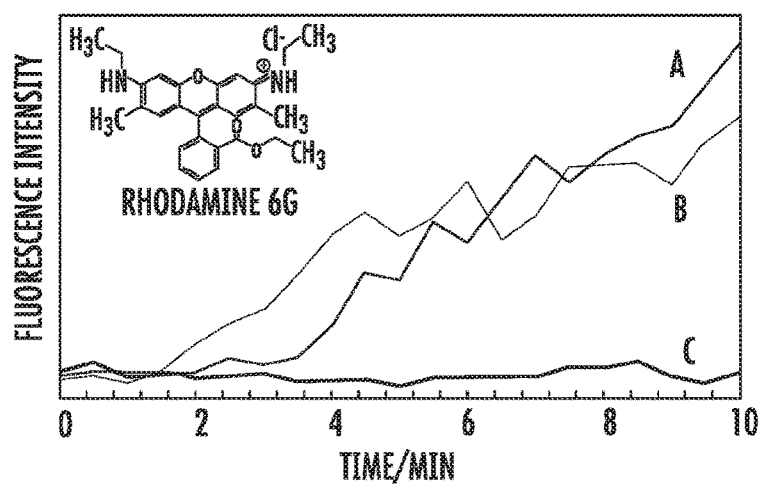
FIG. 14 is a plot showing results from a leak test of bare PES support (A), nanozeolite deposited PES support (B), zeolite membrane, M8 (C).

Mechanical Properties—Leak Test Using a cell, the leak of the dye Rhodamine 6G across the membrane was compared for bare PES support, seeded support and M8. The dye is sufficiently large that it cannot penetrate through the 7.4 Å windows of the faujasite supercage. FIG. 14 shows the fluorescence measured on the other side of the membrane. For the bare PES and the seeded support, the dye leaks through after the first two minutes, as measured by the fluorescence on the opposite side of the support. In case of M8, the dye leakage is prevented over 10 minutes, indicating that there are fewer mesopore defects on M8.

Figures 15A, 15B, 15C, 15D:
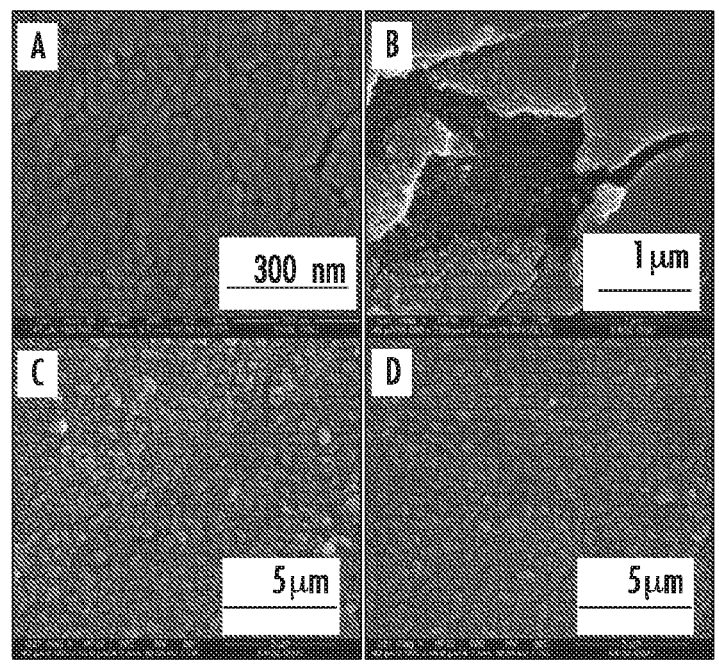
FIGS. 15A-15D are SEM images of zeolite seed layer before (15A) and after (15B) tape test and zeolite membrane before (15C) and after (15D) tape test.

Tape Test: A test of the mechanical stability of the seeded support and M8 was compared by pressing down a Scotch tape on the membrane surface and then peeling it off. FIG. 15 shows the SEM micrographs before and after the test. The surface of the seed layer is destroyed (FIG. 15B), including some damage to the underlying PES support. However, M8 appears to remain intact, as seen in FIG. 15D, and the tape process could be repeated 10 times without any damage to the membrane, as determined by SEM.

Transport Measurements with M8: Table 4 compares the transport data of a bare PES support, seeded support and M8. All transport measurements were done at room temperature.

The surface of the bare support, seeded support and M8 was coated with a thin film of PDMS by spin coating. The monomers can penetrate any intercrystalline defects and then upon polymer formation, the defects would be sealed. FIG. 16 shows the cross-section data, indicating that a thin 150 nm layer of PDMS covers the entire zeolite membrane. Table 4 shows that $CO_2/N_2$ selectivity of M8 is improved with a selectivity of ~72.3, while still maintaining high $CO_2$ permeance (~789.0 GPU).

Figure 17A:
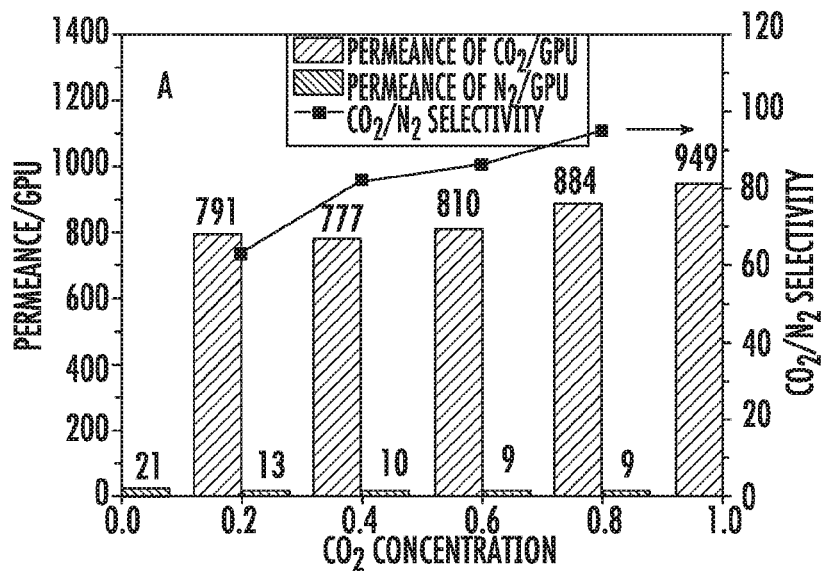
FIGS. 17A-17B are bar graphs showing the separation property of PDMS/M8 membrane as a function of feed gas composition (17A) and temperature change (17B).
Figure 17B:
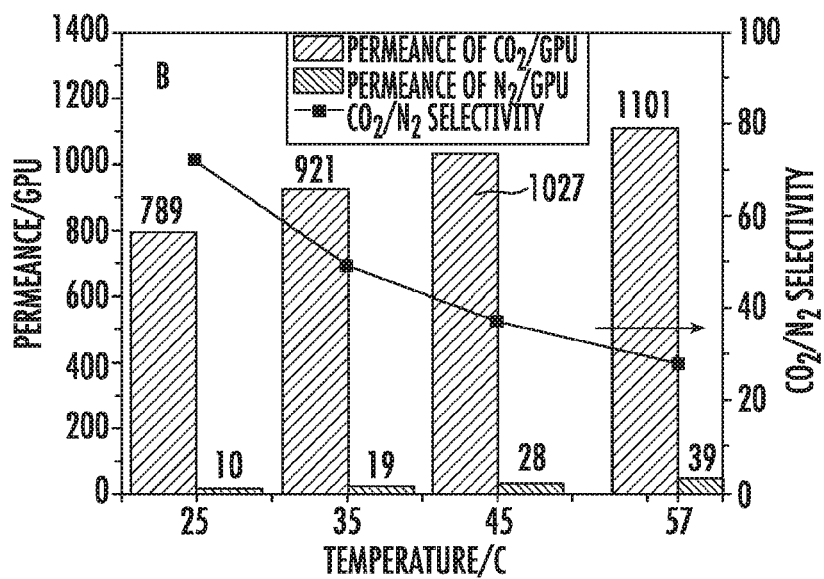

FIG. 17 compares the transport properties of M8 with changes in feed gas composition, and temperature. As seen in FIG. 17A, for M8, with increasing $CO_2$ concentration, the $N_2$ permeance decreases, whereas the $CO_2$ permeance increases, with the overall selectivity exhibiting an increase with $CO_2$ concentration. FIG. 17B shows that with increasing temperature (25-57° C.), both $CO_2$ and $N_2$ permeance increase, but the latter is more pronounced and the overall selectivity decreases.

TABLE 4

Transport Measurement Results of M8 Related Membranes

| Sample Name | $CO_2$ Permeance/GPU | $N_2$ Permeance/GPU | $CO_2/N_2$ Selectivity |
|---|---|---|---|
| PES only | 3675.4 | 3118.1 | 1.2 |
| Seed/PES | 2990.2 | 2514.4 | 1.2 |
| M8 | 1497.5 | 1273.5 | 1.2 |
| PDMS/PES | 383.6 | 22.8 | 16.8 |
| PDMS/Seed/PES | 810.1 | 52.4 | 15.5 |
| PDMS/M8 | 789.0 | 10.9 | 72.3 |

Figure 18:
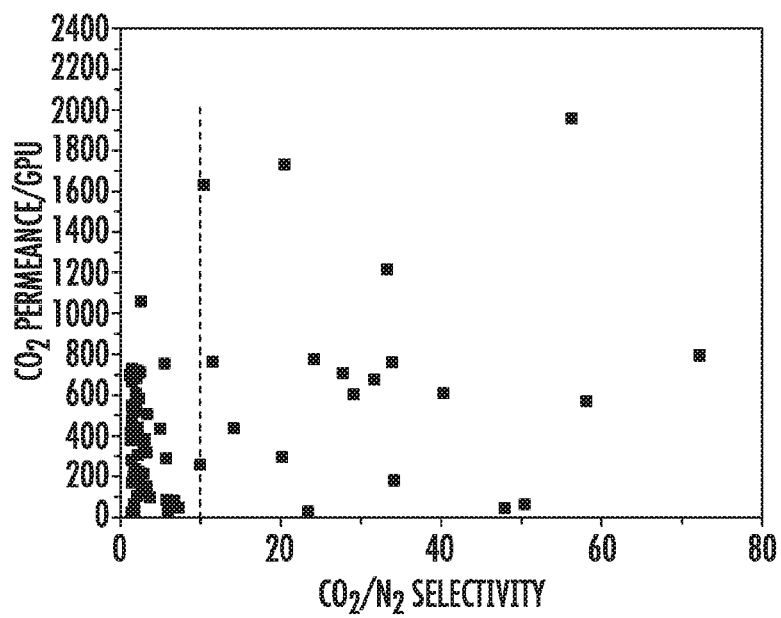
FIG. 18 is a scatter plot showing the separation characteristics of PDMS/M8 membranes.

Reproducibility of Membranes: Eighty M8 membranes with PDMS coating were fabricated and their transport properties examined. FIG. 18 shows the data for all M8 membranes tested. There is some variation in the transport data. In some of these membranes, there were large defects that the PDMS did not heal. Optical micrographs of the M8 membrane was taken FIG. 19B. There were no obvious cracks, and the membrane appears uniform.

Discussion

Optimal Conditions for Membrane Growth: There were eight different synthesis strategies, three of which resulted in continuous zeolite membrane formation. The steps involved in the rapid zeolite synthesis, shown in FIG. 10, are relevant for understanding membrane formation. An aged gel of composition $0.048Na_2O:Al_2O_3:4.35SiO_2: 2.40(TMA)_2O (2OH): 1.2(TMA)2O(2Br): 249H_2O$ was put through two stages in a reflux apparatus. During stage I, half of the water is removed during reflux over the period of one hour, and in stage II, this water is added back during the course of an hour. This process leads to rapid growth of zeolite Y powder, with the process sped up by a factor of four as compared to a conventional hydrothermal synthesis using the same composition. At the end of stage I, the gel that is present is amorphous, but extensively nucleated. This gel referred to as the 60-min gel was isolated and used as a reactant for membrane formation.

Zeolite membranes were successfully synthesized from seeded PES support. Because PES membrane is hydrophobic, vacuum was created on the back of PES membrane to help zeolite seed deposition. Neutral to basic pH was found to produce uniform seed cover layers <300 nm thick, as shown in FIG. 9.

As Table 3 and FIG. 11 shows, M1 and M2 grown with only the 60 min-gel and 60-min gel mixed with seed did not form a membrane. All trials with seeded membranes with and without 60-min gel coating (M3, M5, M7) when introduced into the reactor system at the beginning of the synthesis (before Stage I starts) did not form optimal membranes. The three M4, M6, M8 that formed continuous membranes were all introduced at the end of stage I, and were subjected only to stage II protocol. Since M8 with only the seed and without any coating of the 60-min gel formed a zeolite membrane, there was no need of the 60-min gel as an intermediate reactant for membrane growth. Thus, the conclusion is that seeded support and growth during the stage II process can be used for continuous membrane formation.

The size of the zeolite seeds are ~30-40 nm, and some fraction of these crystals penetrate into the PES support, as evident from the cross-section SEM in FIG. 13B. These interpenetrated crystals along with the surface seeds grow during the stage II phase, and this intergrown layer within the membrane anchors the top membrane layer. This may explain why unseeded supports such as M1 and M2 do not form membranes. The gel coating in M1 and M2 fell off during the synthesis. All attempts with different surface treatments (M3, M5, M7) introduced in the beginning of the reaction also do not result in optimal continuous membrane, mostly formation of crystals on the PES support surface. Introduction after stage II shows successful membrane growth (M4, M6, M8), since the highly supersaturated solutions present in the heavily nucleated reaction medium after stage I help rapid growth of zeolite in the spaces between the seed crystals, resulting in membrane growth within an hour. The M8 strategy does not require coating with the 60-min gel and was the focus of further characterization and transport measurements.

Properties of M8 Membranes: The formation of a uniform deposition on the PES support is evident from the optical micrograph in FIG. 12C, and X-ray diffraction confirms that faujasite framework (FIG. 12D) is being formed. The cross-section SEM image in FIG. 13C suggests that the zeolite membrane is 250-300 nm thick on the PES support. The M8 membrane was sturdy due to the growth within the porous support, arising from the penetration of seeds and subsequent growth in the PES support. The infiltration into the support provides mechanical rigidity, as seen in the tape test of FIG. 15.

A membrane preparation procedure in which the synthesis mixture is infiltrated into the pores of a porous $\alpha$-$Al_2O_3$ support by manipulation of gel viscosity followed by hydrothermal growth with a clear solution for 24 h has been reported. With these long growth times, zeolite growth in the large pores of the alumina support was noted, which adversely affected the transport properties.

Even though dye leaking test in FIG. 14 indicates that the intercrystalline porosity is being removed upon membrane formation, the gas transport measurements in Table 4 indicates that there are defects within the membrane. The permeance of both $CO_2$ and $N_2$ decrease as the PES support is covered with zeolite seeds and upon M8 growth. The separation factor of as-synthesized M8 ($\alpha\approx1.2$) is comparable to previous studies with defective zeolite Y membranes.

Fixing Defects: The separation factor for the seeded and zeolite (M8) membrane was close to 1.2, which is near the Knudsen factor (0.8) indicating mesopority. PDMS is chosen in the present study to fix the mesoporous defects on M8-type zeolite membranes. PDMS is thermally stable and can be polymerized after spin coating of monomer, crosslinker and catalyst on membrane. With spin coating of PDMS monomer solution, small monomer molecules penetrate into the defects. After cross-linking, polymerized PDMS blocks all the defects. The PDMS cross-sectional size, based on tetramethylsilane, is 0.8 nm and will not penetrate into zeolite cages.

Figures 16A, 16B:
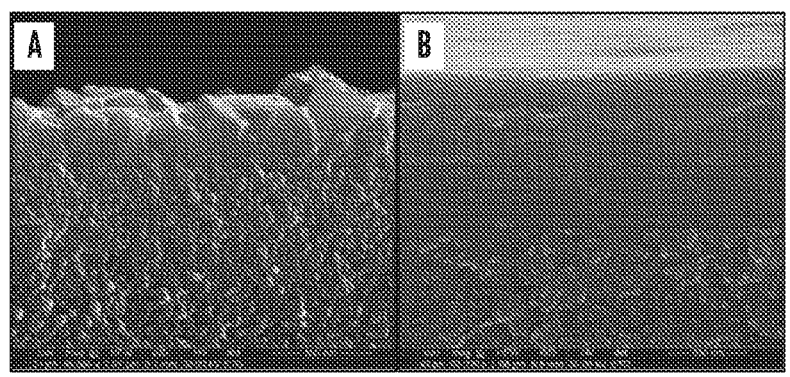
FIGS. 16A-16B shows the side-view of SEM images of zeolite membrane (16A) and PDMS coated zeolite membrane (16B).

Transport Studies: FIG. 16B shows a ~150-200 nm PDMS layer on the M8 membrane. A thin layer of PDMS of 150 nm has been estimated to provide a permeance reduction for $CO_2$ of <1%. If PDMS penetrates into the supporting membrane layers through macro/meso defects, then the permeance will decrease significantly. In order to examine the role of PDMS alone, both bare PES support and a seeded PES support were coated with PDMS. As seen in Table 4, there is a significant drop in permeance, and an improvement in selectivity from 1.2 for uncoated supports to ~16 with PDMS cover layer. The $CO_2/N_2$ separation factor for pure PDMS is reported to be around ~10 at room temperature. With a PDMS layer on M8, the defect density is significantly decreased, leading to an improvement of $CO_2/N_2$ selectivity from 1.2 to 72 (Table 4), with $CO_2$ permeance of 789.0. Thus, zeolite membrane is responsible for the improved selectivity.

The feed gas compositional study shown in FIG. 17A also indicates that the gas separation is occurring via the zeolite pores. The separation factor based on pure gas permeance for M8 is 45.2, and increase with $CO_2$ content in the feed to a final value of 95.1 for a 1:4 $N_2$:$CO_2$ mixture. This indicates that the separation mechanism of M8 membrane involves selective adsorption of $CO_2$ within the zeolite cages, which blocks the permeance of $N_2$. Preferential adsorption and diffusion of $CO_2$ in the zeolite pores stems from its higher quadrupole moment. This trend in selectivity is consistent with previous studies on zeolite membranes on alumina supports. Using the formula $$P = \frac{D}{\delta RT}$$

where P is the permeance, D the diffusivity, $\delta$ the membrane thickness, D was calculated to be $2\times10^{-9}$ $m^2s^{-1}$.

The temperature dependence of the $CO_2$ and $N_2$ permeance for the zeolite membrane follows the same trend, but the increase in $N_2$ permeance outpaces that of $CO_2$, decreasing the overall selectivity. This trend is consistent with previous studies of zeolite Y on alumina membranes in the temperature range that were examined (25-57° C.). The increase in $CO_2$ permeance with temperature primarily arises from increased surface diffusivity. The temperature dependence of the selectivity is caused by the reduced adsorption of $CO_2$ on the zeolite framework, promoting enhanced transport of $N_2$.

M8 membranes reported in this example were only dried under ambient conditions, so have considerable amounts of water in the zeolite. Such highly structured water can be advantageous for gas separations. The presence of water can increase $CO_2$ flux and selectivity, due to $CO_2$ dissolution in a water-like film.

Reproducibility of Membrane Performance: Eighty membranes were made following the procedure for M8 and their transport properties were examined. The $CO_2$ permeance as well as the $CO_2/N_2$ selectivity are plotted in FIG. 18. Some variation in performance was seen. This arises because of cracks that develop in the membrane. However, with careful manipulation of the membrane, high quality transport data is obtained. The issue of reproducible manufacture of zeolite membranes on conventional alumina supports has been addressed.

Comparison to Studies in the Literature: In Table 5, the performance of the crack-free M8 membrane with literature reports of zeolite Y on alumina supports is shown. Though all these studies were done in the same temperature range, some experimental parameters may vary (e.g. flow rate, sweep gas).

All of the zeolite membranes in Table 5 were synthesized on α-alumina supports at 90-100° C. for 12 hours to several days. Zeolite Y membranes can be grown on the inner and outer surface of tubes. Typically for zeolite membrane grown on outer surface, thickness was 10 pun and it has 289 GPU $CO_2$ permeance and 50 $CO_2/N_2$ selectivity. While, for inner surface zeolite membrane, thickness was lower, 5 μm and $CO_2$ permeance and $CO_2/N_2$ selectivity were 4477 GPU and 32, respectively. Seike et al. reported zeolite Y membrane synthesized on stainless steel plates formed by electrophoretic deposition of zeolite Y crystals followed by heat treatment. This membrane has $CO_2$ permeance of 1600 GPU and $CO_2/N_2$ selectivity of 20. Other researchers have also reported zeolite membranes for $CO_2/N_2$ separation. The separation factors for $CO_2/N_2$ vary between 5 and 50. Zeolite membranes grown on porous α-alumina disks have been reported. With 8 hour synthesis, 2 μm thick zeolite Y membrane with $CO_2/N_2$ selectivity higher than 550 and $CO_2$ permeance of 12 was observed. With longer synthesis time of 7 days, zeolite Y membrane's high $CO_2/N_2$ selectivity was maintained and $CO_2$ permeance increased to 290. A more recent study concluded that these zeolite membranes has nanoscale defects and could be assisting in the separation process. One advantage of the M8 membrane is that it is grown on a polymer support within a very short time period (1 hour) and also is the thinnest membrane (~300 nm) among reported zeolite membranes.

TABLE 5

Comparison of zeolite membranes for $CO_2/N_2$ separations and in this study

| Ref | Membrane support | Membrane thickness/μm | Synthesis Condition | Temperature/ ° C. | CO2 Permeance/GPU | CO2 Selectivity |
|---|---|---|---|---|---|---|
| 1 | α-alumina tube | 10 | 90° C., 24 h | 30 | 289 | 50 |
| 2 | α-alumina tube | 10 | 90° C., 24 h | 40 | 836 | 45 |
| 3 | α-alumina tube | 10 | 90° C., 24 h | 35 | 3880 | 30 |
| 4 | α-alumina tube | 5 | 90° C., 24 h | 35 | 4477 | 32 |
| 5 | α-alumina tube | 3 | 90° C., 24 h | 35 | 3283 | 37 |
| 6 | α-alumina disk | 4 | 90° C., 12 h | 50 | 116 | 20 |
| 7 | α-alumina tube | 10 | 85° C., 24 h | 50 | 1039 | 5.7 |
| 8 | α-alumina tube | 3 | 90° C., 24 h | 35 | 2567 | 19 |
| 9 | from SS plate | 60 | 80° C., 30 h | 25 | 1612 | 20 |
| 10 | α-alumina disk | 50 | 100° C., days | 25 | 448 | 54 |
| 11 | α-alumina disk | 2 | 90° C., 8 h | 30 | 12 | >550 |
| 11 | α-alumina disk | 0.6 | 100° C., 7 d | 30 | 290 | 503 |
| Our | PES membrane | 0.3 | 100° C., 1 h | 25 | 789.0 | 72.3 |

*1 GPU = 3.35 × $10^{-10}$ mol/($m^2$ · s · Pa)

Conclusion

A 300 nm zeolite membrane has been synthesized on polymer support and the composite membrane shows comparable $CO_2/N_2$ separation property with reported zeolite membranes. Synthesis process takes only 1 hour.

REFERENCES

[1] Kusakabe, K.; Kuroda, T.; Murata, A.; Morooka, S. *Ind. Eng. Chem. Res.* 1997, 36, 649-655.
[2] Kusakabe, K.; Kuroda, T.; Morooka, S. *J. Membr. Sci.* 1998, 148, 13-23.
[3] Kusakabe, K.; Kuroda, T.; Uchino, K.; Hasegawa, Y.; Morooka, S. *AIChE J.* 1999, 45, 1220-1226.
[4] Hasegawa, Y.; Kusakabe, K.; Morooka, S. *Chem. Eng. Sci.* 2001, 56, 4273-4281.
[5] Hasegawa, Y.; Watanabe, K.; Kusakabe, K.; Morooka, S. *J. Membr. Sci.* 2002, 208, 415-418.
[6] Gu. X.; Dong, J.; Nenoff, T. M. *Ind. Eng. Chem. Res.* 2005, 44, 937-944.
[7] Guillou, F.; Rouleau, L.; Pirngruber, G.; Valtchev. V. *Microporous Mesoporous Mater.* 2009, 119, 1-8.
[8] Hasegawa, Y.; Watanabe, K.; Kusakabe, K.; Morooka, S. *Sep. Purif. Technol.* 2001, 22-23, 319-325.
[9] Seike, T.; Matsuda, M.; Miyake, M. *J. Mater. Chem.* 2002, 12, 366-368.
[10] Cheng, Z.; Gao, E.; Wan, H. *Chem. Commun.* 2004, 1718-1719.
[11] White, J. C.; Dutta, P. K.; Shqau, K.; Verweij, H. *Langmuir* 2010, 26, 10287-10293.

Example 3

Fabrication of Zeolite/Polymer Composite Membranes in a Roller Assembly

Membranes are cost-effective solutions for many industrial separations. Polymer membranes are widely used in gas separations. Because of the solubility-diffusion mechanism of transport, the permeance and selectivity of polymer membranes are inversely related, and is considered a limitation. Zeolite membranes do not have this limitation, but zeolite membrane synthesis is a batch process with long synthesis times and presence of defects. The resulting high costs of manufacture make zeolite membranes non-competitive for most applications. In this study, a roll-to-roll method was employed for zeolite synthesis on a polymer support exploiting a gel that leads to rapid zeolite crystallization and a bendable zeolite membrane structure. Membranes were grown under both compressive and tensile stress, and with zeolite structure both on top and within the pores of the polyethersulfone (PES) support. The structure of the membranes was evaluated by electron microscopy. Membranes were coated with a thin layer of polydimethylsiloxane, and evaluated for $CO_2/N_2$ separation, relevant for $CO_2$ capture from flue gas of power plants. As long as the zeolite membrane is grown within the PES support, highly reproducible $CO_2/N_2$ separation performance with $CO_2$ permeance of 1881±204 GPU and $CO_2/N_2$ selectivity of 34±4 was observed immaterial of the stress conditions under which it was grown. For zeolite membrane grown on top of the PES support, the compressive stress resulted in crack formation, with poor transport properties. Demonstration of zeolite membrane fabrication with roll-to-roll method illustrates the potential for industrial level scale up.

Introduction

Polymer membranes are cost effective platforms for a wide variety of gas separations, and in particular in carbon sequestration applications. With increase in gas permeance, there is typically a decrease in selectivity for polymer membranes (Robeson limit). Inorganic zeolite membranes do not have this limitation. Computational studies have noted that faujasitic zeolite with pore size of 7.4 Å can have $CO_2/N_2$ selectivity higher than 500 and $CO_2$ permeability of 10,000 Barrer (1 Barrer=$3.35 \times 10^{-16}$ mol·m/(m$^2$·s·Pa)) considerably better than polymeric membranes. Because of their unique gas separation performance, zeolite membranes have been an active research area. However, application of zeolite membranes on a commercial scale is limited to only one application, that of ethanol pervaporation, because of their high cost. Most zeolite membrane research has thus far focused on the laboratory scale.

Polymer membranes have low manufacturing costs because of the roll-to-roll fabrication process. Roll-to-roll process has also been applied for nanoparticle alignment on membrane support and pattern printing on films. However, roll-to-roll fabrication methods have not previously been applied in zeolite synthesis, because conventional zeolite synthesis typically requires a long incubation time. In addition, conventional zeolite synthesis typically employs rigid alumina supports that are not compatible with roll-to-roll technologies.

As described above, a dehydration/rehydration strategy was developed to decrease the synthesis time of faujasitic zeolites with crystallization times of <2 hours. This time scale is potentially compatible with roll-to-roll synthesis methods. Using this method, flat-sheet zeolite membranes were synthesized and examined for $CO_2/N_2$ gas separation. A bendable zeolite membrane concept was developed by growing zeolite layer only within a polymer membrane. Notably, the gas separation property was maintained after bending to a certain curvature.

In this study, a roll-to-roll synthesis setup for zeolite membrane growth within a polymer has been designed and applied for membrane growth. Membranes were characterized with X-ray diffraction (XRD), scanning electron microscopy (SEM) and $CO_2/N_2$ gas separation. This study demonstrates the potential of producing zeolite membranes in similar fashion to polymeric membranes

EXPERIMENTAL

Chemicals

Ludox HS-30 colloidal silica ($SiO_2$, 30%), aluminum isopropoxide (Al(O—CH(CH$_3$)$_2$)$_3$, 98%), tetramethylammonium bromide ((CH$_3$)$_4$NBr, 98%) and Ludox SM-30 colloidal silica ($SiO_2$, 30%) were purchased from Aldrich (Milwaukee, Wis., USA). Aluminum hydroxide (Al(OH)$_3$, 76.5%) was purchased from Alfa Aesar. Tetramethylammonium hydroxide ((TMAOH), 25% aqueous solution) was purchased from SACHEM Inc. Sodium hydroxide (NaOH, 99.0%) was purchased from Fisher Scientific. Dehesive 944 Polydimethylsiloxane (PDMS) was provided by Wacker Silicones, Inc. Helium (4.5 grade), carbon dioxide (4.0 grade) and nitrogen (4.5 grade) were purchased from Praxair. Polyethersulfone (PES) 300 kDa membrane was purchased from MILLIPORE Biomax. $H_2O$ used in this study was purified by a Millipore ultrapure water system. All chemicals were used as received without further purification.

Zeolite Membrane Synthesis with Roll-to-roll Setup

Zeolite Y Nanoparticle Synthesis. Nano sized zeolite Y seeds were synthesized according to a literature procedure with composition of 0.048 Na$_2$O: 2.40 (TMA)$_2$O(2OH): 1.2 (TMA)2O(2Br): 4.35 $SiO_2$: 1.0 Al$_2$O$_3$: 249 H$_2$O, where TMA$^+$ is tetramethylammonium cations (B. A. Holmberg, et al. *Microporous Mesoporous Mater.* 59, 13-28, 2003). Briefly, 26.2 g Ludox HS-30 and 10.46 g TMAOH were mixed in a sealed bottle and stirred at room temperature for 30 min. 12.5 g aluminum isopropoxide was dissolved in mixture of 76.5 g H$_2$O and 52.3 g TMAOH solution, and heated in a water bath at 70° C. until complete dissolution. After cooling to room temperature, 13.1 g TMABr was added to alumina source solution followed by mixing with the silicon source. The clear sol was aged at room temperature with stirring for 3 days and then in an oil bath at 100° C. for 4 days. After synthesis, nanozeolite particles were separated by ultracentrifugation, and washed until pH of supernatant was 7. Purified nanozeolite seed dispersion was stored as a 1 wt % aqueous stock solution.

Deposition of Zeolite Y Nanoparticle on PES Support. Nanozeolite seed particles were deposited on PES supports by vacuum assisted dip-coating. PES supports were soaked in distilled water overnight and then in isopropanol for 1 hour before washing with water again. Nanozeolite dispersion was ultra-sonicated for 1 hour and diluted with distilled water to the required concentration. About 20 mL of nanozeolite suspension was placed in petri dish. The PES support was dipped in the petri dish for 3 seconds. A ~25 psi vacuum was applied on the back of the PES support to pull the seeds onto the support. After coating, the support was dried at room temperature overnight and stored in plastic sample bags.

Roll-to-Roll Synthesis Setup. The roll-to-roll synthesis setup designed in this study is shown in FIG. 21. This setup included 4 parts: rollers, reactor, temperature controller and a rehydration assembly. Two identical motor rollers and one fixed column all of diameter of 5.1 cm were used. Nonwoven fabric band was affixed to the rollers and fixed column, and could be moved with adjustable rolling speed. The temperature controller included a thermocouple, a digital temperature controlling box and four 100 W heaters placed in the holes at the bottom of the reactor. The reactor temperature was set at 100° C. Rehydration of gel was realized by continuous addition of water from a burette.

Roll-to-Roll Synthesis of Zeolite Membranes. The gel composition used in the reactor was: 8.3 Na$_2$O:1 Al$_2$O$_3$:6.4 $SiO_2$:483.9 H$_2$O. After dissolving 4.416 g of Al(OH)$_3$ and 14.58 g NaOH in 170.48 g H$_2$O, 27.7 g Ludox® SM-30 was added to the gel. The mixed gel was then sealed in a polypropylene bottle and aged at room temperature for 4 hours. The aged gel was then transferred to a dehydration/rehydration hydrothermal setup for removal of half the water in 1 hour. This partially dehydrated hot gel was then immediately transferred to the reactor shown in FIG. 21 and heated to 100° C. Seeded PES support was stapled onto the outer side of rolling non-woven fabric band. The entire PES support was immersed into the gel in the beginning of zeolite growth. During 1 hour of zeolite growth process, water was added to the gel, diluting the gel from 120 mL to 200 mL. At the same time, the PES support moved through the gel due to movement of the rolling non-woven fabric via the rollers. After zeolite growth, the membrane sample was washed with flowing water and rubbed with a fur brush, soaked in water to remove residual surface species and dried for further study.

Polydimethylsiloxane (PDMS) Coating

Zeolite membranes were spin coated with PDMS (Dehesive 944 kit) before gas separation test. The commercial PDMS was provided in 3 separate bottles—one containing PDMS monomer, one containing catalyst, and one containing cross-linker (the exact nature of these chemicals is proprietary, and the procedure followed was supplied by the vendor). First, PDMS monomer solution was diluted with heptane. After complete dispersion, cross linker and catalyst were added with the ratio of 100:1:0.5 (PDMS:Cross linker:Catalyst) to prepare the PDMS precursor solution. Before spin coating, zeolite membrane sample was taped on a spin coating support, which provides mechanical stability in spinning process. The PDMS precursor solution was then dropped to cover entire membrane surface area, and left for 3 seconds before spinning. Samples were spun at 2,000 rpm for 5 seconds followed by 4,000 rpm for 1 min. After coating, PDMS was polymerized at room temperature overnight.

Characterization

A Bruker D8 X-Ray Diffractometer with CuKα ($\lambda$=1.5405 Å) was used to characterize the phase composition of zeolite membranes. FEI Helios Nanolab 600 Dual Beam Focused ion Beam/Scanning Electron Microscope (FIB/SEM) was employed to characterize surface morphology of zeolite membrane samples.

Gas Separation Study

The fabricated zeolite membrane was applied for $CO_2/N_2$ separation. Gas flow compositions were controlled with a flow box and mass flow controllers from SIERRA Instruments Inc. Feed gas and sweep gas had flow rates of 60 mL/min and 30 mL/min, respectively. Compositions of permeate and retentate gas were investigated using a SRI 310C gas chromatograph equipped with a Hysep D column and TCD detector.

Results

Synthesis of Zeolite Membrane

The roll-to-roll synthesis setup shown schematically in FIG. 21A was employed to synthesize zeolite membranes while moving through a heated aluminosilicate gel. FIG. 21B shows a picture of this setup. This setup includes 2 moving rollers, a fixed column dipping in a reactor containing the aluminosilicate gel, a heater assembly for controlling the temperature of the bath, a stirrer for stirring the gel, and a burette assembly for adding the water back during the synthesis. The rollers and fixed column have diameter of 5.1 cm. The nonwoven fabric band was attached to the two rollers and fixed column as shown in FIG. 21A. During the synthesis process, the two rollers rotate in a clockwise fashion with adjustable speed, so that the nonwoven fabric band moves through the gel from right to left as shown by arrows marked in FIG. 21A. Temperature control was achieved with four 100 W heaters, a thermocouple, and a digital temperature controlling box (FIG. 21B). Commercial PES (300 kDa) ultrafiltration membranes was chosen as the polymer support. PES includes a ~100 µm mesoporous PES layer on top of a ~200 Atm non-woven fabric. The PES layer had an average pore size of ~70 nm and a porosity of 15%. Nanozeolite seed particles of 30-40 nm in size were coated onto the PES support using a vacuum-assisted coating method. The seeded PES support (4 cm×2 cm) was then stapled onto the band of non-woven fabric, which was rolled during the synthesis process through the reactive aluminosilicate gel.

Figure 22A:
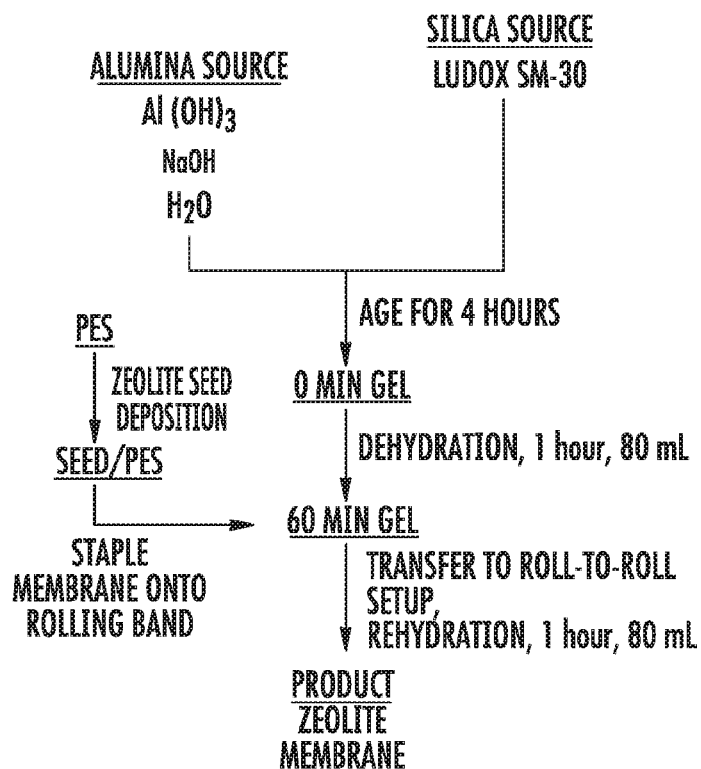
FIG. 22A is a flow chart illustrating the synthetic procedure used for the roll-to-roll synthesis of membranes.
Figure 22B:
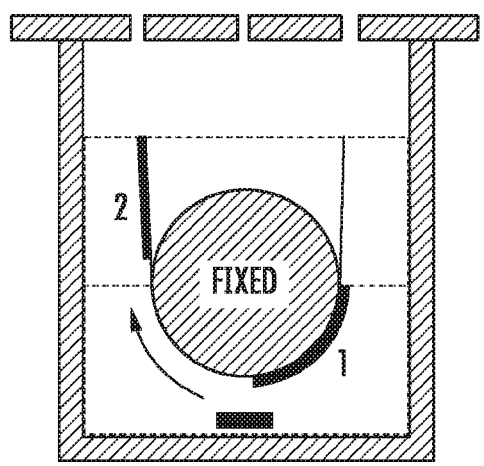
FIG. 22B is a schematic illustration of the zeolite membrane synthesis in a roll-to-roll synthesis cell. Position 1 is the starting position of the seed coated PES on non-woven fabric and Position 2 is the ending position of the membrane after synthesis is complete.
Figure 23A:
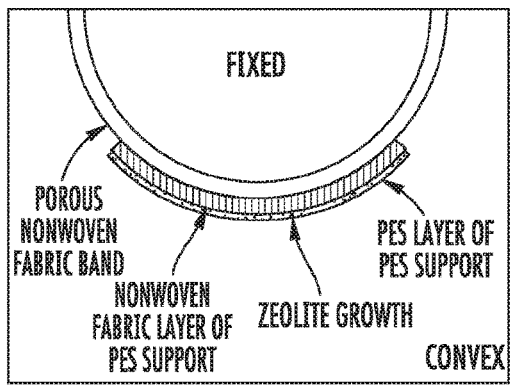
FIG. 23 is a schematic illustration of the convex (panel a) and concave (panel c) synthesis geometries realized in the roll-to-roll reactor, and the type of stress experienced during convex (panel b) and concave (panel d) growth and eventual flattening of membrane.
Figure 23B:
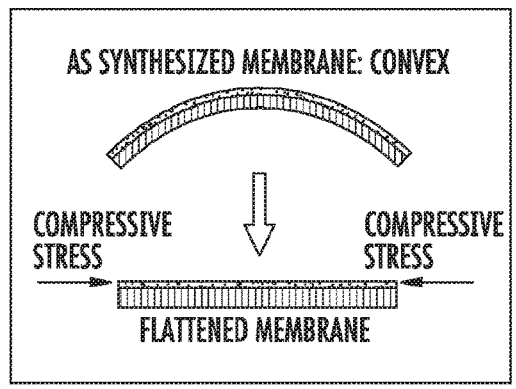
Figure 23C:
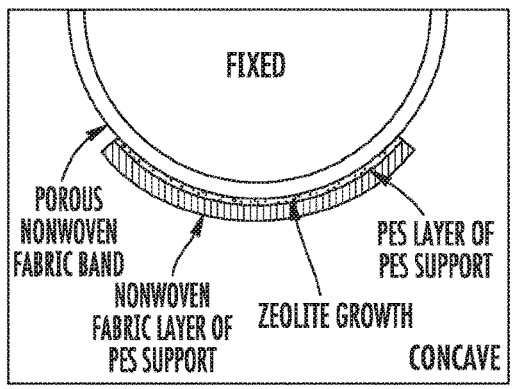
Figure 23D:
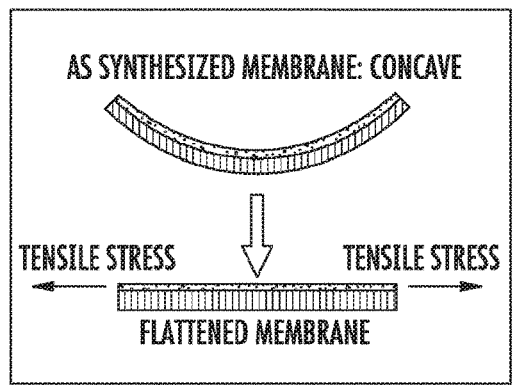

The synthesis process is schematically shown in FIG. 22A. An aluminosilicate gel of composition of 8.5 $Na_2O$:1 $Al_2O_3$:10.9 $SiO_2$:974 $H_2O$ was prepared, aged, and heated under reflux, and 50% of the water was removed to provide a gel of composition 8.5 $Na_2O$:1 $Al_2O_3$: 10.9 $SiO_2$:487 $H_2O$. The hot partially dehydrated gel was transferred into the reactor, where it totally immersed the PES support, as shown in FIG. 22B. The composition was heated to 100° C. Initially, the seeded PES support was bent around the 5.1 cm fixed column. As the crystallization proceeded and the PES band was rolled, the zeolite membrane was slowly flattened. During the hour roll-to-roll synthesis process, the nanozeolite seeded PES support moved from "Position 1" to "Position 2," as illustrated in FIG. 22B. At the same time, the volume of zeolite gel increased from 120 to 200 mL because of rehydration of thee gel via continuous addition of water from a burette (FIG. 21B). The final fabricated zeolite membrane had a flat geometry.

Two different geometries of zeolite growth were explored. FIG. 23 illustrates these geometries. In the first case (convex), the seeded PES side of the support was directly exposed to the hot aluminosilicate gel. As growth occurred over one hour, and the membrane moved from Position 1 to 2, the flattening of the membrane lead to compressive stress, as shown in FIG. 23, panels a and b. Two different nanozeolite seed loading levels of the PES were examined in this particular geometry (10 and 14 µg/ml). In the second geometry (concave), the seeded PES layer (10 µg/ml) faced towards the fixed column, being separated from it by the highly porous non-woven fabric band (which acts as the moving support, as well as letting reactants through). In this case, as the membrane moved from Position 1 to 2, upon flattening, the membrane was subjected to tensile stress, as show in FIG. 23, panels c and d.

Characteristics of Zeolite Membranes Prepared by Roll-to-Roll Synthesis

Figure 24:
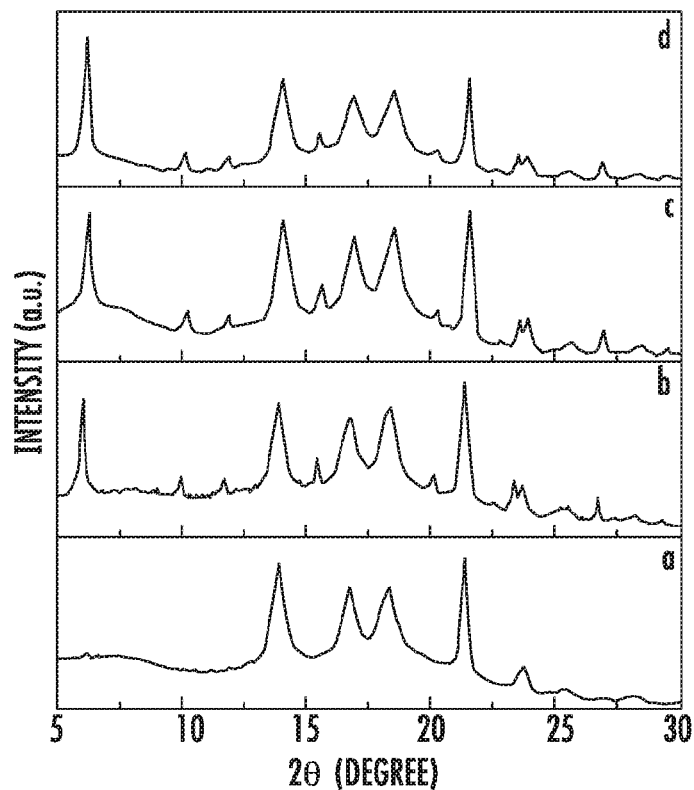
FIG. 24 is a plot showing the x-ray diffraction patterns of bare PES support (panel a), convex membrane grown from 14 μg/mL seeded support (panel b), convex (panel c) and concave (panel d) membrane grown from 10 μg/mL seeded support.

The x-ray diffraction (XRD) pattern of bare PES support, and membranes synthesized by the three methods are shown in FIG. 24. From these XRD patterns, it is apparent that a zeolite with the faujasite framework was formed on the PES in all cases.

Figure 25:
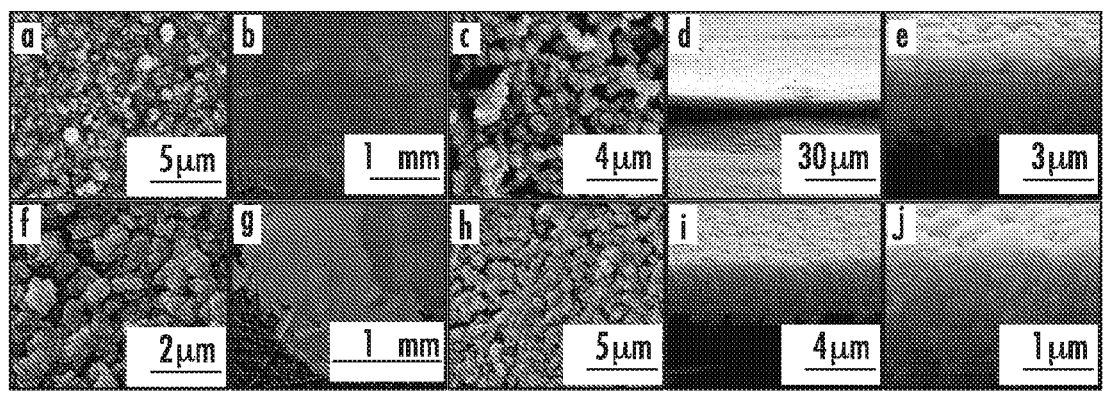
FIG. 25 shows SEM micrographs of zeolite membranes synthesized with roll-to-roll process with (panels a-e) concave and (panels f-j) convex geometries: (panel a) and (panel f) are top-view of as-synthesized membranes; (panel b), (panel c), (panel g) and (panel h) are zeolite films with PES dissolved, with (panel c) and (panel h) being of higher magnification; (panel d), (panel e), (panel i) and (panel j) are side view SEM of zeolite films at different resolutions after PES dissolution

FIG. 25 compares the morphology of the membranes grown in the two geometries for the low seed loading (10 µg/ml) sample. For the concave geometry (FIG. 25, panel a), there are less crystals on the top of the PES membrane as compared to the convex geometry (FIG. 25, panel e), though in both cases the underlying PES matrix is visible, indicating that this top layer is not continuous. In both cases, the PES was dissolved with N-methylpyrrolidone (NMP), and large slabs of interconnected zeolite crystals (cm scale, visible to the naked eye) were found (FIG. 25, panels b and g, note the layer resting on the non-woven fabric). A continuous zeolite layer was formed within the PES membrane. FIG. 25, panel c and panel h, are higher resolution images of the zeolite layer, and shows that they are made up of small crystals. The side view of the self-standing zeolite films for the two geometries are compared in FIG. 25, panels d and e and FIG. 25, panels i and j. The thickness of the concave membrane was 5 µm, as compared to 3 µm for the convex membrane. The zeolite particles making up the inorganic layer are of the order of 100 nm. For the two films, the exposure to the aluminosilicate gel was significantly different. In the convex film, the PES was in direct contact with the aluminosilicate gel, whereas in the concave film, only the species that can penetrate through the pores of the non-woven fabric contacted the seeded PES layer (FIG. 23). This difference explains the presence of more as well as larger crystals on the surface of the convex film, as well as the lower thickness since the gel cover inhibits nutrients from reaching the PES as effectively.

Figure 26:
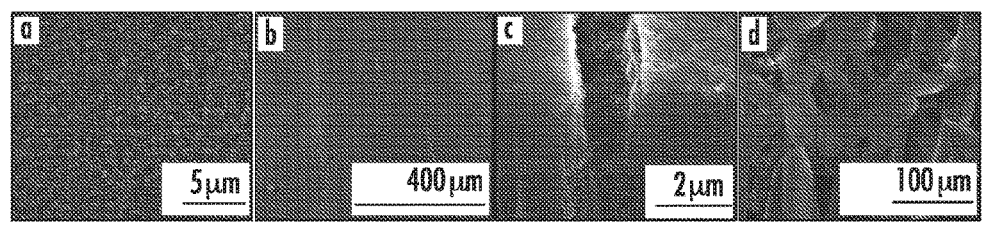
FIG. 26 shows SEM micrographs of zeolite membranes synthesized with roll-to-roll process in convex geometry with high zeolite seed loading: (panel a) is top view of as-synthesized membranes; (panel b) and (panel c) are top views of cracks on as-synthesized membranes at different magnifications and (panel d) is zeolite film after PES dissolution.

The convex geometry synthesis was also investigated using a higher loading of nanozeolite seeds in the PES (14 µg/ml). The morphology of the as-obtained material is shown in FIG. 26. There was a continuous layer on the surface of well-connected zeolite crystals, and the PES support was not visible (FIG. 26, panel a). At lower magnification, parallel cracks were visible on the membrane (FIG. 26, panel b). Closer inspection of the cracks show that the PES film was intact (FIG. 26, panel c). Upon dissolution, only small pieces of zeolite membrane on the non-woven fabric layer were evident (FIG. 26, panel d).

$CO_2/N_2$ Separation Performance

Figure 27A:
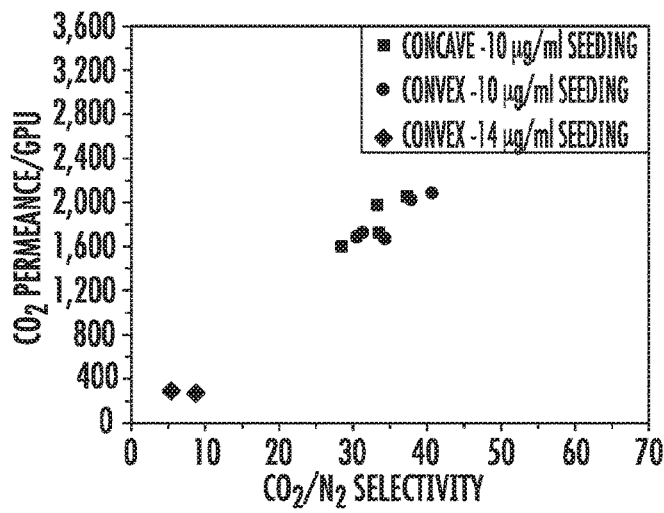
FIG. 27A is a plot of $CO_2/N_2$ gas transport results ($CO_2$ Permeance in GPU, y-axis; and $CO_2/N_2$ Selectivity, x-axis) of zeolite membranes from roll-to-roll setup (concave—10 µg/mL seeding, square data points; convex—10 µg/mL seeding, circle data points; and concave—14 µg/mL seeding, diamond data points).

Zeolite/PES membranes fabricated by roll-to-roll synthesis were coated with PDMS (200-300 nm) before evaluating the membranes for $CO_2/N_2$ separation. Five membrane samples were prepared with concave geometries with low seed loading. The $CO_2/N_2$ separation performance is shown in FIG. 27A. The membranes exhibited a $CO_2$ permeance of 1881±182 GPU and a $CO_2/N_2$ selectivity 34±3. Five samples were also prepared with the convex geometry. The membranes exhibited a $CO_2$ permeance of 1841±181 GPU and a $CO_2/N_2$ selectivity of 35±4. Two samples prepared in the convex geometry using the higher seed loading were also evaluated. These membranes exhibited a $CO_2$ permeance of 275±14 GPU and a $CO_2/N_2$ selectivity of 7±2.

Figure 27B:
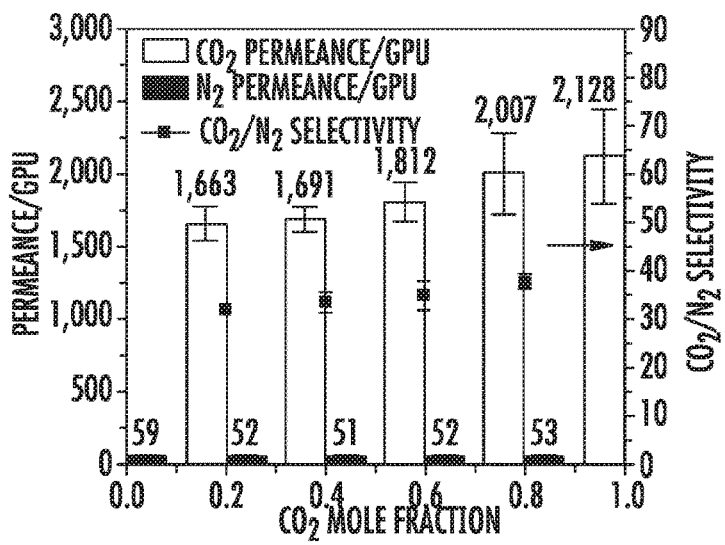
FIG. 27B is a plot of $CO_2$ Permeance (in GPU, right bar), $N_2$ Permeance (in GPU, left bar), and $CO_2/N_2$ Selectivity at varying mole fractions of $CO_2$ in the feed gas.
Figure 27C:
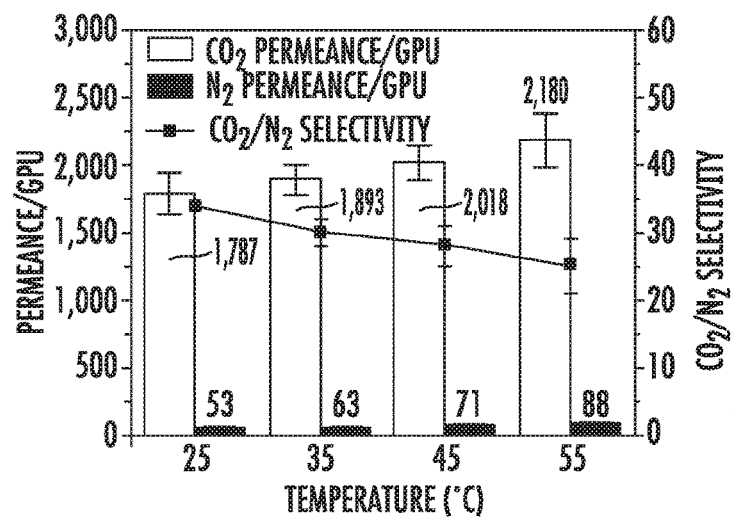
FIG. 27C is a plot of $CO_2$ Permeance (in GPU, right bar), $N_2$ Permeance (in GPU, left bar), and $CO_2/N_2$ Selectivity at varying temperatures of feed gas.

Further investigations were carried out using one of the convex films prepared using a low seed loading. The $CO_2/N_2$ selectivity increased with $CO_2$ mole fraction, as did $CO_2$ permeance, as shown in FIG. 27B. The dependence of the transport properties of this film on temperature is shown in FIG. 27C, with both $CO_2$ and $N_2$ permeance increasing with temperature, while $CO_2/N_2$ selectivity decreased. With higher $CO_2$ mole fraction in feed gas, the blocking effect was stronger, and the penetration of $N_2$ molecules through zeolite pores was more difficult. Because gas separation was realized by adsorption and diffusion, gas transport rate across the membrane increased with temperature. These observations suggest that the zeolite is responsible for the transport properties of the membranes.

The mechanical flexing stability of five different sets of the PDMS-coated membranes grown via the low seed convex method was also examined. The membranes were bent around different radii of curvature, in the two possible directions. Following bending, the $CO_2/N_2$ transport properties of the membranes were measured. The results are summarized in Table 6 below. These results suggest that the membranes are stable up to bending around a 2.5 cm radius in either the bending in or bending out geometry.

TABLE 6

Gas separation performance change with different bending diameters for PDMS coated convex membranes

| Bend Direction | Diameter/cm | $CO_2$ Permeance/GPU | $N_2$ Permeance/GPU | $CO_2/N_2$ Selectivity |
|---|---|---|---|---|
| As-synthesized (Convex) | — | 2030 | 54 | 38 |
| Bending in | 2.5 | 1860 | 51 | 37 |
|  | 1.3 | 1408 | 1094 | 1 |
| Bending out | 2.5 | 1617 | 45 | 36 |
|  | 1.3 | 1666 | 1421 | 1 |

A convex geometry membrane was repeatedly tested over a period of three days. A gradual decrease in both $CO_2$ and $N_2$ permeance was observed (day 1: $CO_2$ 1882 GPU, and $N_2$ 56 GPU; day 2: $CO_2$ 1707 GPU, and $N_2$ 54 GPU; day 3: $CO_2$ 1480 GPU, and $N_2$ 43 GPU); however, the $CO_2/N_2$ selectivity remained constant at 34. Similar changes in permeance have been observed for membranes grown in a flat geometry.

Several control experiments were conducted using convex geometry membranes. Without the PDMS coating, the $CO_2$ and $N_2$ permeance were 2466 and 2096 GPU, respectively, and $CO_2/N_2$ selectivity was 1. With only PDMS on the PES support, a $CO_2/N_2$ selectivity of 14 was observed. In another experiment, PDMS was coated on a seed layer of nanozeolite on PES to mimic a mixed matrix membrane. The $CO_2$ and $N_2$ permeance were 607 and 46 GPU, respectively, and $CO_2/N_2$ selectivity of 12, close to that of a PDMS/PES membrane. Thus, the roll-to-roll grown zeolite membranes coated with PDMS perform much better than mixed matrix membranes, which are a collection of zeolite crystals covered with PDMS.

Discussion

In this study, rapid growth processes for zeolite synthesis were used to a membranes that undergo flexing during the synthesis process. Synthesis was accomplished using a roll-to-roll assembly, in which a seeded PES support was rolled slowly through an activated gel (FIGS. 21 and 22).

Two possible membrane geometries during synthesis were explored, one in which the membrane was subjected to a compressive stress (convex) and the other in which the membrane was subjected to tensile stress (concave) upon completion of the membrane growth and subsequent flattening (FIG. 23). A third membrane was prepared using a higher loading seed sample, and was grown in the convex geometry. In the latter case, a continuous zeolite membrane was formed on top of the PES support, as shown in FIG. 26.

For these continuous zeolite films grown on top of PES, the compressive stress upon flattening leads to multiple parallel cracks (FIG. 26, panel b). Strains can arise in the zeolite film due to material growing into the grain boundaries of the film, which cannot be accommodated upon flattening. In some of these films, wedge cracks were also noted, indicating shear forces in the film. Many studies have evaluated the mechanical stability of continuous inorganic layers deposited on polymers. Such films can be susceptible to cracking under mechanical bending. Parallel cracks, such as those observed in FIG. 26, panel b, were also noted in 100 nm thick silicon oxynitride deposited on polyethylene naphthalate (PEN) and polyethylene terephthalate (PET) (125-130 microns) films.

There are two explanations for these cracks. First, during synthesis, due to thermal mismatch, the inorganic layer can be under compressive stress and the polymer layer under tensile stress. In order to relieve the stress, the polymer layer cracks open, causing the inorganic film to crack. A second possibility is that the film is under compressive stress, and to reduce the strain energy, the film buckles resulting in cracks. In this case, one would not expect the polymer layer to be influenced. FIG. 26, panel c shows that in the case of zeolite grown on top of the film, the PES layer is intact, suggesting that the compressive stress in the zeolite film is leading to cracking.

For the zeolite membranes grown within the PES pores, in both convex (compressive) and concave (tensile) growth, no obvious defects were noted on the membrane surfaces (FIG. 25). Upon dissolution of the PES, large, continuous films of connected zeolite crystals were observed. The thicknesses of the inorganic membrane was higher in the concave than in the convex sample (FIG. 25). In the case of the concave membrane, only a few crystals were observed on the top surface, whereas in the convex membrane, many more particles were observed on the top surface of the membrane.

To improve transport properties, the membranes were coated with a 200-300 nm layer of PDMS. Because PDMS monomer has molecular size of 0.80 nm, which is larger than pore size of zeolite Y (0.74 nm), PDMS is expected to fix mesoporous defects in the membrane, but not to penetrate into the microporous zeolite pores. As long as the zeolite membrane was formed within the PES pores, the $CO_2/N_2$ transport properties were similar (FIG. 27A). Since PDMS alone has $CO_2/N_2$ selectivity of ~10, the $CO_2/N_2$ selectivity of 34-35 was attributed to the zeolite layer. However, in the case of the zeolite membrane grown on top of the PES, the cracks were too large for PDMS to have any effect, and the transport properties were seriously compromised (FIG. 27A).

Typically, most inorganic oxides grown on substrates are under compressive stress, and the stress can be reduced by formation of cracks. This is consistent with the formation of cracks in the case of the continuous zeolite film formed on top of PES. However, the stability of the zeolite film grown under stress within the PES was unexpected.

Importantly, the success of this type of zeolite membrane growth paves the way for a continuous process, mimicking the very successful polymer membrane growth, extensively realized for several technological applications. This could be accomplished using a reactor into which an optimized aluminosilicate gel solution was continuously fed. This should allow zeolite growth activity to be maintained over longer periods, which would allow process of zeolite membrane growth to be made continuous for long lengths of zeolite-polymer membranes.

Conclusion

Zeolite membranes were prepared using a roll-to-roll process. The process was completed in 1 hour, with the zeolite growing within the pores of the PES support or on top of the support depending on the nanozeolite seed levels. Membranes were prepared in both a convex and a concave geometry. With PDMS coating, zeolite membranes grown within the PES support have $CO_2$ permeance of 1880 GPU and $CO_2/N_2$ selectivity of 34. However, zeolite membranes grown on top of the PES support were found to crack under compressive stress. This study demonstrates that continuous roll-to-roll processes can be used to prepare low-cost zeolite membranes.

Example 4

Synthesis Rate Improvement Strategies for Colloidal Nano Zeolite Y

Nanozeolites have attracted interest because of their small size, high surface area, and short diffusion pathway. However, the industrial scale production of nanozeolites has been limited by a typically low synthesis rate (~0.1% per hour). In this study, the synthesis rate of colloidal nanozeolite Y was improved by the rational tuning of zeolite nucleation and $Na^+$ concentration in the synthesis composition. When using an aged zeolite synthesis precursor, the Na:Al ratio has to be maintained below 0.07 to prevent the formation of zeolite A. By dehydrating the aged clear solution by 25% (v/v), both nucleation and crystallization of nanozeolite Y were completed in 20 hours with a yield of 7%. The supernatant from the initial synthesis was isolated and used as raw material for rapid zeolite synthesis. Because the supernatant was extensively nucleated, rapid and continuous addition of NaOH significantly improved yield without the formation of zeolite A. Overall, the synthesis rate in this study was ~3% per hour, which is about 30 times greater than conventional nanozeolite Y synthesis. The stage synthesis rate from the supernatant was higher than 10% per hour. Once formed, the nanozeolite products were fully characterized using X-ray Diffraction (XRD), Dynamic Light Scattering (DLS), Transmission Electron Microscopy (TEM), $^{29}Si$ Nuclear Magnetic Resonance ($^{29}Si$ NMR), and $N_2$ adsorption.

Introduction

Zeolites are microporous aluminosilicates crystalline materials with enclosed cages and channels of molecular size. With narrow pore size distribution and strong catalytic active sites, zeolites find wide applications in catalysis, separation and sensing. The morphologies of zeolite crystals can vary widely from microns to nanometers. Compared with conventional micron sized zeolites, nanometer-sized zeolites (especially <100 nm) possess large external surface area and short diffusion path. Nanozeolites can be used in the synthesis of structured zeolite materials (e.g., membranes, films, etc.), sensing, catalysis, and biomedical diagnostics. Among 225 synthesized zeolite frameworks, zeolite X/Y (faujasite, FAU) is one of the most industrially important zeolite frameworks, with applications in petroleum hydrocracking, as well as $CO_2$ separations.

Even for zeolites of the same framework, the synthetic conditions used to make zeolites of different sizes vary considerably. Micron sized zeolites, produced in tonnage quantities, are conventionally synthesized in an opaque gel system with high yield (>80%) and wide particle size distribution. In contrast, the preparation of nanosized zeolites with narrow particle size distributions typically requires highly reactive and uniform precursors, such as a clear-solution synthesis system, with low crystallization temperature and a relatively high concentration of alkali and organic cations. The preparation of nanozeolites is generally characterized by low yields and long synthesis times.

As described above, nanozeolites can be used to fabricate membranes useful for $CO_2/N_2$ separation. In one case, a 200 nm layer of nanozeolite was deposited on a porous polyethersulfone support by vacuum deposition. A thin 100 nm polymer layer was formed on top of the nanozeolite layer which acts as the active medium for $CO_2/N_2$. By including the nanozeolite layer, the transport properties of the membrane were improved. It was proposed that the nanozeolite layer provided a more uniform surface coating, which resulted in thinner polymer coatings, and the zeolite layer also ensured minimum penetration of the polymer into the porous support.

Besides the improved transport properties of the nanozeolite—polymer composite, the manufacturability of the membrane via roll-to-roll machines can significantly lower the cost of the membrane modules. However, one of the limitations of the scale up is the availability of nanozeolite. To address this need, improved synthetic methods for preparing nanozeolites were developed.

Specifically, the rate of colloidal nano faujasitic (nanoFAU) zeolite synthesis was increased while maintaining a clear solution synthesis composition and increasing yield. Seeding, microwave (MW), and dehydration/rehydration hydrothermal (DRHT) synthesis were applied and optimized to accelerate nanoFAU synthesis. The supernatant of the first round synthesis was reused to further improve yield. X-ray Diffraction (XRD) was employed to study the crystalline phase of zeolite samples. Dynamic Light Scattering (DLS) was used to measure particle size of colloidal zeolites.

Transmission Electron Microscopy (TEM) was for zeolite crystal morphology characterization. $^{29}$Si Nuclear Magnetic Resonance ($^{29}$Si NMR) provided information of Si and Al inter connection as well as Si/Al of samples. N$_2$ adsorption Brunauer-Emmett-Teller (BET) characterized the surface area of zeolite samples.

EXPERIMENTAL

Chemicals

Ludox® HS-30 colloidal silica (SiO$_2$, 30%), aluminum isopropoxide (Al(O—CH(CH$_3$)$_2$)$_3$, 98%) and tetramethylammonium bromide ((CH$_3$)$_4$NBr, 98%) were purchased from Aldrich (Milwaukee, Wis., USA). Tetramethylammonium hydroxide ((CH$_3$)$_4$NOH, 25% aqueous) was purchased from SACHEM Inc. Sodium hydroxide (NaOH, 99%) pellet from Fisher Scientific (NaOH, 99.0%) was used. All chemicals were used without purification. Pure water was produced by a Millipore ultrapure water system.

Synthetic Procedure

Zeolite Synthesis Precursor Preparation. A nanozeolite synthesis clear solution was prepared as reported in literature (Holmberg, B. A.; Wang, H.; Norbeck, J. M.; Yan, Y. Controlling Size and Yield of Zeolite Y Nanocrystals Using Tetramethylammonium Bromide. *Microporous Mesoporous Mater.* 2003, 59 (1), 13-28). The composition was: 0.048 Na$_2$O:2.40 (TMA)$_2$O(2OH):1.2 (TMA)2O(2Br):4.35 SiO$_2$: 1.0 Al$_2$O$_3$:249 H$_2$O (TMA$^+$ is tetramethylammonium). Briefly, 26.2 g Ludox® HS-30 and 10.46 g TMAOH were mixed as the silicon source, and stirred at room temperature for 30 min before use. The aluminum source was then prepared by mixing 76.5 g H$_2$O, 52.3 g TMAOH, and 12.5 g aluminum isopropoxide in a 70° C. water bath. Then, 11.3 g TMABr was added to the mixture, and the solution was stirred at room temperature for 15 min. Finally, the silicon source and the aluminum source were combined slowly and aged at room temperature with stirring for 3 days to obtain aged solution (solution A).

Supernatant Isolation. A supernatant from zeolite synthesis (solution B) was isolated by removing particles from the product mixture of nanozeolite after the first-round of synthesis via ultra-centrifugation. Solution B was stored in a refrigerator at 2° C. before use. Either solution A or solution B can be used as precursor for zeolite synthesis.

Seeded Assisted Solution A. A seeded precursor was prepared by mixing chemicals, as described above, to prepare solution A. After mixing the aluminum source and the silicon source, 100 mg of nanozeolite seeds was added to the solution before room temperature aging.

Microwave (MW) Heating. 25 g of zeolite synthesis precursor was placed in a MW tube, and heated by microwave at 300 W for 1 hour with magnetic stirring. Microwave treatment was accompanied by air cooling with an equilibrium temperature of 135-140° C.

Dehydration/Rehydration Hydrothermal (DRHT) Synthesis. In DRHT synthesis, 100 g of synthesis precursor was mixed with NaOH and placed in the flask of a reactor. Dehydration of the precursor was realized by water evaporation from the precursor. Evaporated water was condensed using a condenser, and collected in a dripper. Rehydration was performed by adding water back to the precursor at a constant rate. Dehydration and rehydration lasted for 30 min in this study.

Results

Influencing Crystallization with a "Clear Solution" Composition

The composition of interest in this study was 0.048 Na$_2$O:2.40 (TMA)$_2$O(2OH):1.2 (TMA)2O(2Br):4.35 SiO$_2$: 1.0 Al$_2$O$_3$:249 H$_2$O (Comp A). Several experiments were carried out using this "clear" solution after 3 days of aging (the aged solution henceforth referred to as agComp A). Particles in agComp A were isolated using high speed centrifugation (22,000 rpm, 5 hours), and XRD patterns were collected. The isolated particles were found to be completely amorphous. Hydrothermal treatment of agComp A for 4 days produced nanoFAU (~40 nm in size) in 5% yield. Seeding assistance, microwave (MW) and dehydration/rehydration hydrothermal (DRHT) treatments were examined to accelerate this process.

Seeding. Seeding can be used to accelerate zeolite growth. Comp A was seeded with nanoFAU crystals (~40 nm) at a loading of 100 mg per 180 mL of solution. Hydrothermal synthesis was then carried out. The XRD pattern of the recovered product was measured at 24-hr time intervals. The XRD analysis demonstrated that it took approximately 4 days for crystallization to be complete. This time scale was comparable to regular Comp A synthesis.

Figure 28A:
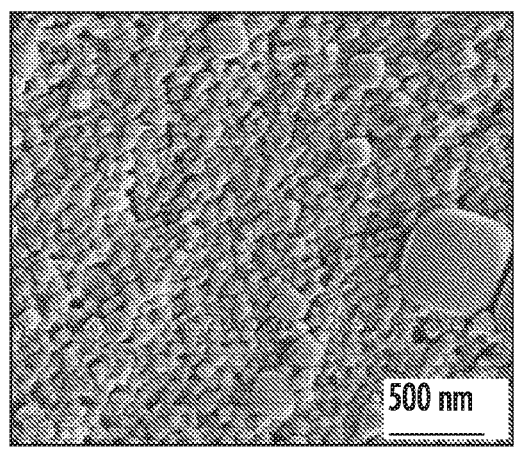
FIG. 28 illustrates the product mixture obtained upon MW heating of agCompA. Panel a shows an SEM micrograph of the product mixture obtained upon MW heating of agComp A. Panel b shows the XRD pattern of (i) the large particles and (ii) the small particles obtained upon MW heating of agComp A (* denotes the peaks characteristic of zeolite A).
Figure 28B:
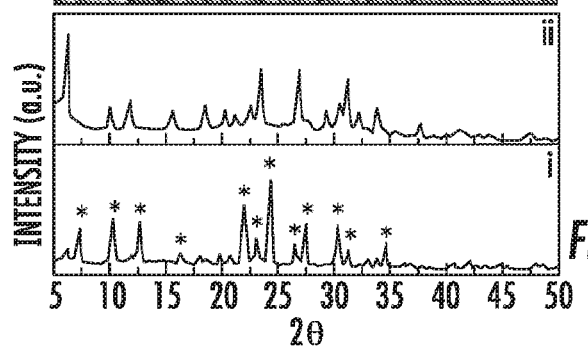

Microwave Treatment. Microwave radiation can be used to accelerate the kinetics of zeolite crystallization. Upon treating agComp A at 300 W of microwave radiation, the solution turned turbid in 4 hours. FIG. 28, panel a shows an SEM of the resultant particles. The particles included a mixture of large cubic and other smaller particles. Low speed centrifugation (2500 rpm), followed by high speed centrifugation (22,000 rpm) resulted in size fractionation into large and small particles. As confirmed by the XRD shown in FIG. 28, panel b, the large particles were primarily zeolite A (with impurity FAU) whereas the small particles were pure FAU. The average particle size of the FAU was 96 nm. The FAU particles were prepared at a yield of 7.3%.

Dehydration-Rehydration Hydrothermal (DRHT) Treatment. The DRHT procedure involved the removal of a certain amount of water from the reaction mixture by distillation during the hydrothermal process, heating of the concentrated reaction mixture for some period of time, and then rehydrating the system with the same amount of water (either pure water or water mixed with specific solutes), the entire process occurring under reflux conditions. In the first experiment with agComp A, half of the water in the reaction mixture (90 ml) was removed under reflux, the process continued and within 2 hours, the solution become turbid. Analysis of the product showed the presence of micronsized crystals of zeolite A. As a consequence, this system was not investigated further.

Figure 29A:
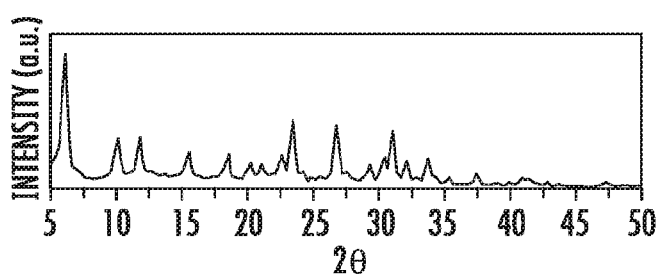
FIG. 29 shows the XRD pattern (panel a), TEM micrograph (panel b), and plot of the particle size distribution (panel c) of nanozeolite particles isolated following a 20 hour DRHT process using agComp A.
Figure 29B:
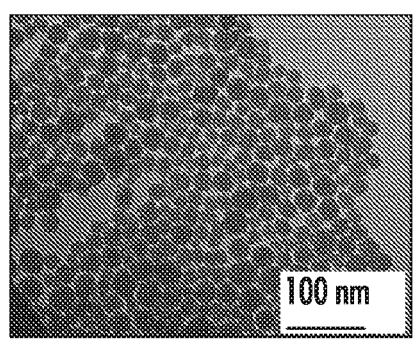
Figure 29C:
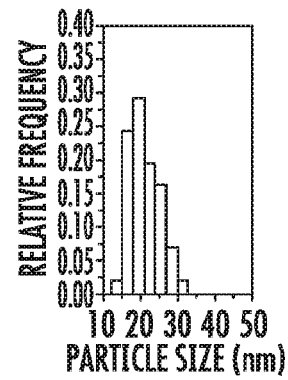

In a second experiment, 25% of the water in the reaction mixture (45 ml) was removed by distillation over 30 min, followed by heating for 19 hours, and then readdition of water over 30 min. All of these steps were performed under reflux. This process resulted in ~64 nm nanoFAU (by DLS) with 7% yield, and the XRD is shown in FIG. 29 (panel a). FIG. 29 (panel b) shows the TEM of crystals, and FIG. 29 (panel c) shows a plot of the particle size distribution, based on the TEM. The size distribution from the TEM peaked at 21 nm with a standard deviation of 4 nm. The optimal reflux time was shown to be approximately 19 hours, with shorter reflux times resulting in incomplete crystallization of FAU. Using the DRHT protocol, the nanoFAU synthesis rate was significantly increased from 0.1% per hour in a typical hydrothermal process to ~0.4% per hour.

In the case of Comp A, seeding had no effect on the crystallization (4 days as with the parent composition), microwave treatment led to the formation of nanoFAU within 4 hours, though with considerable amounts of LTA, and DRHT led to completion in 20 hours. While microwave was the fastest process, the considerable yield of LTA made this process ineffective for high yields, since nutrients in the supernatant became depleted.

Studies with Supernatant of Comp A:

As hydrothermal synthesis resulted in <10% yields of nanozeolite, significant amounts of nutrients remained in the supernatant. The supernatant was extensively centrifuged (100,000×), and the solid that was recovered was examined by XRD and TEM. The supernatant was found to include a mixture of amorphous material and small crystals (~7 nm) of FAU. Light scattering indicated that the FAU crystals had particle sizes of 21 nm.

Microwave Treatment of Supernatant. The supernatant recovered after 4 days of hydrothermal synthesis with agComp A was treated with NaOH (60 mg of NaOH per 100 mL of supernatant), and then subjected to microwave radiation of 300 MW. Some visible zeolite crystals were observed in the solution within one hour. XRD of the product showed exclusively FAU crystals. The solution was centrifuged (2500 rpm) to remove visible particles, and higher speed ultracentrifugation (22000 rpm) resulted in recovery of nano FAU with a size of ~32 nm, at a yield of 10%. In another set of experiments, three consecutive cycles of microwave radiation were conducted, each cycle lasting for one hour with NaOH (60 mg per 100 mL solution) added prior to each microwave heating cycle. Both large micron-sized FAU (yield 26%) and nano-FAU (45 nm, yield 35%) were observed by SEM in the product after 3 cycles. Overall, focusing only on the nanozeolite, the yield rate was 11% per hour for the 3 cycles.

Figure 30A:
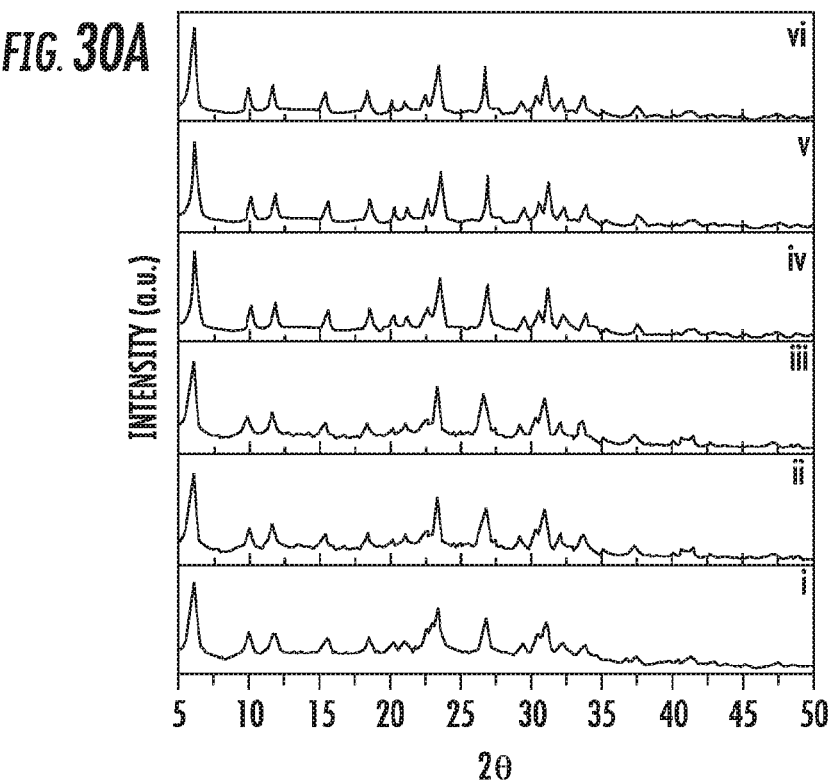
FIG. 30 shows the XRD pattern (panel a) and a plot of the average particle size (as determined by DLS) and percent yield (panel b) of nanozeolite formed after the (i). $1^{st}$, (ii). $2^{nd}$, (iii). $3^{rd}$, (iv). $4^{th}$, (v). $5^{th}$ and (vi). $6^{th}$ heating cycle of supernatant of agComp A with DRHT.
Figure 30B:
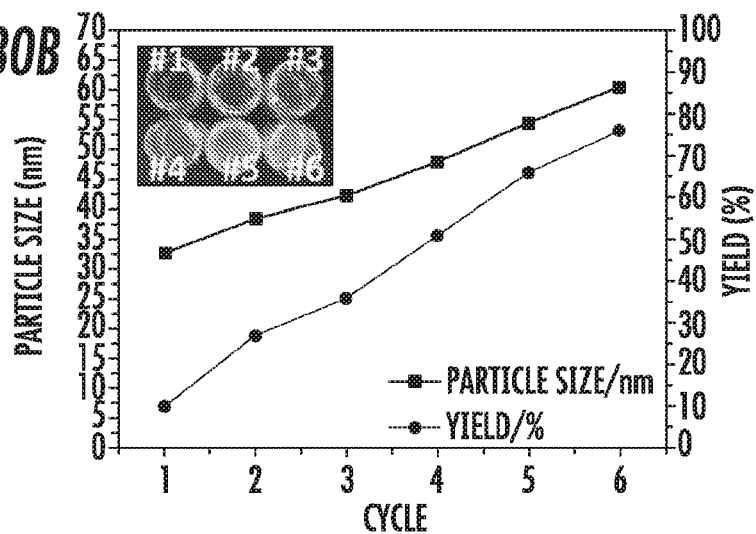

DRHT Treatment of Supernatant. Several protocols of DRHT experiments were evaluated. The first protocol was 30 min dehydration+30 min reflux+30 min rehydration for a total of 90 min for the first cycle. With DRHT, except the initial 0.06 g of NaOH addition, other NaOH addition steps were conducted by dissolving NaOH pellets in the condensed water in the dripper, which was then added, thereby making the process continuous (for a total of 60 mg NaOH per 100 mL of solution for each cycle). The cycles were repeated until FAU no longer formed. FIG. 30 (panel a) shows the XRD diffraction curves obtained from the product collected from 6 cycles. Pure FAU was synthesized during all 6 cycles. Large particles of other phases, including zeolite A, began to form during the $7^{th}$ cycle. FIG. 30 (panel b) shows a plot of the average particle size (Based on DLS) and percent yield for each cycle. The cumulative yield increased evenly at each cycle, with an average of a 12% yield at each cycle. The particle size of nanoFAU increased from 30 nm to 60 nm (based on DLS) during the course of the 6 cycles.

The nanoparticles collected after the $2^{nd}$ (DRHT-2), $4^{th}$ (DRHT-4) and $6^{th}$ (DRHT-6) cycles in the DRHT process were further characterized.

Surface Area. The surface areas of DRHT-2, DRHT-4 and DRHT-6 were determined to be 504 $m^2/g$, 685 $m^2/g$ and 666 $m^2/g$, respectively.

TEM. The morphology of nanozeolite particles from DRHT-2, DRHT-4 and DRHT-6 were characterized by TEM at various length scales. Atomic fringes confirmed the formation of nanoFAU particles. A few of the DRHT-2 particles had wavy edges, while the DRHT-4 and DRHT-6 crystals had sharp edges. The particle size distribution was estimated using TEM. DRHT-2, DRHT-4 and DRHT-6 had average particle sizes of 23±4 nm, 25±4 nm and 31±4 nm, respectively.

$^{29}Si$ NMR. The $^{29}Si$ NMR of the nanozeolite particles in DRHT-2, DRHT-4 and DRHT-6 were collected. The Si/Al ratios of the nanozeolite particles in DRHT-2, DRHT-4 and DRHT-6 were determined to be 1.70, 1.50 and 1.51, respectively. These values are lower than the nanoFAU collected in initial hydrothermal synthesis using an identical precursor composition (2.37).

A second DRHT protocol which involved a 2 hours cycle (30 min dehydration+1 hour reflux+30 min rehydration) was also tested. NaOH (120 mg per 100 mL of solution) was added during rehydration. The first two cycles produced nanoFAU, with a total yield of 62% and an average particle size of 54 nm (by DLS) after the second cycle.

With the supernatant from agComp A after the 4-day hydrothermal synthesis, DRHT increased the rate of nano-FAU formation to 8% per hour for the first DRHT protocol (30 min dehydration+30 min reflux+30 min rehydration) and 16% per hour for the second DRHT (30 min dehydration+1 hour reflux+30 min rehydration) protocol.

Control Experiments

Several control experiments were carried out to evaluate the nature of CompA and the supernatants.

A composition was prepared by removing 25% from agComp A. This composition was then aged for 3 days, and subjected to DRHT treatment. The product recovered after a 20 hour protocol (30 min water removal+19 hours reflux+30 min water addition) was analyzed using XRD. Only sodalite crystals together with amorphous particles were observed.

In a second control experiment, the effect of rehydration was evaluated by subjecting agComp A to a 19½ hour protocol (30 min water removal+19½ hours of reflux, no water added back). The recovered product was then analyzed by XRD. The supernatant from this composition was then subjected to 6 cycles of DRHT (30 min water removal+1 hour reflux+addition of 60 mg NaOH per 100 mL of solution via a concentrated 5M solution). The product from each cycle was analyzed by XRD. XRD of the product from the first two cycles indicated the presence of FAU and SOD, whereas the latter cycles were pure FAU. This suggests that rehydration is necessary to form FAU.

In a third control experiment, agComp A was treated under hydrothermal conditions, and the supernatants were recovered after 2 and 3 days. Both of these solutions were subjected to DRHT (30 min water removal+30 min reflux+30 min rehydration with 60 mg NaOH per 100 mL of solution). XRD analysis suggested that over the first 3 cycles, when the 2-day supernatant was used, LTA was the majority phase, and when the 3-days supernatant was used, FAU was the majority product, but LTA was still present.

Figure 31A:
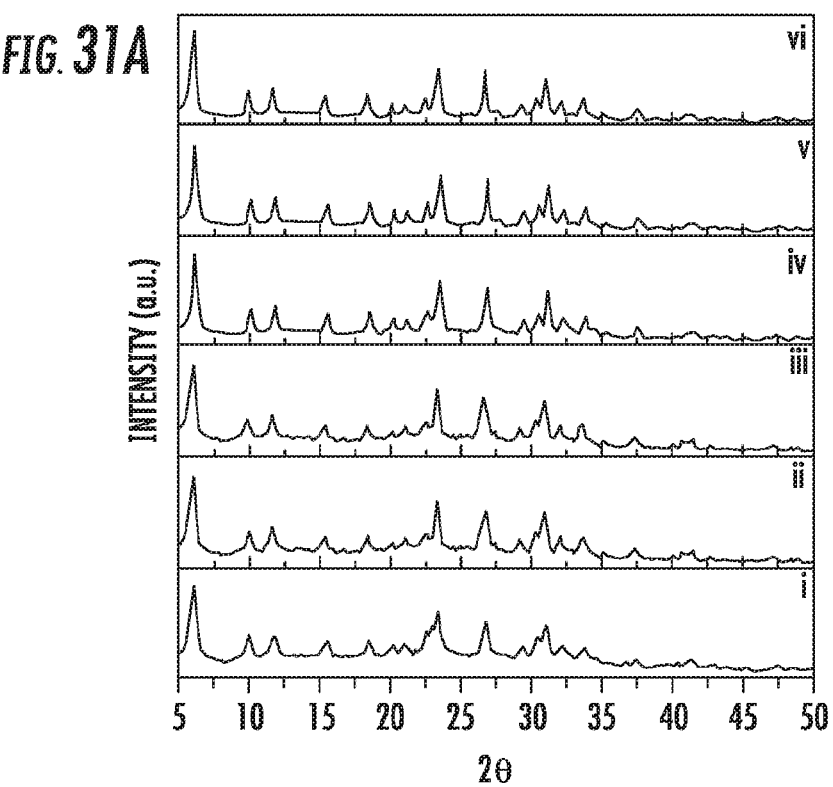
FIG. 31 shows the XRD pattern (panel a) and a plot of the average particle size (as determined by DLS) and percent yield (panel b) of nanozeolite formed after the (i). $1^{st}$, (ii). $2^{nd}$, (iii). $3^{rd}$, (iv). $4^{th}$, (v). $5^{th}$ and (vi). $6^{th}$ heating cycle of DRHT supernatant of agComp A with 6 cycles DRHT process.
Figure 31B:
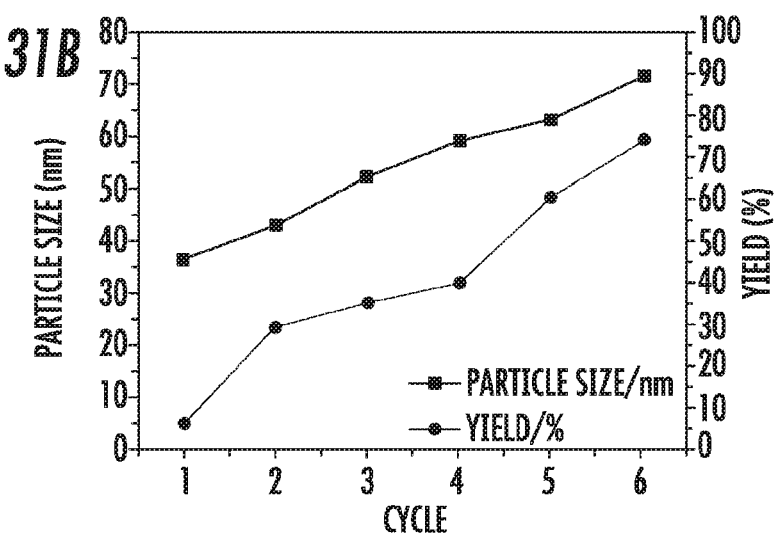
Figure 32A:
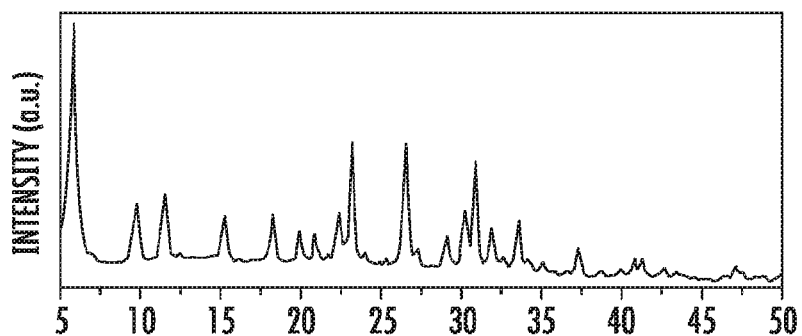
FIG. 32 shows the XRD pattern (panel a), TEM micrograph (panel b), and plot of the particle size distribution (panel c) of nanozeolite particles isolated following a 20 hour DRHT process using DRHT supernatant of agComp A.
Figure 32B:
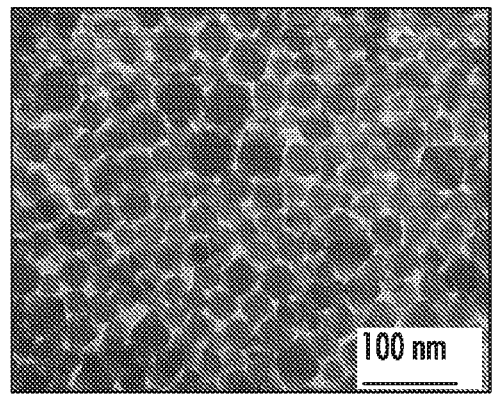
Figure 32C:
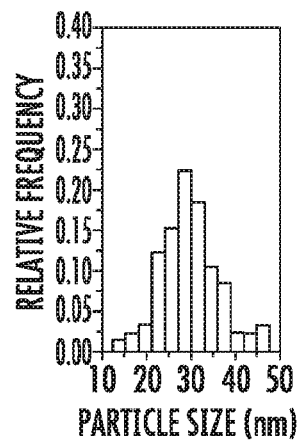

In a final control experiment, agComp A was treated with DRHT (1 hour of dehydration+19 hours of reflux+1 hr of dehydration). The supernatant was recovered and subjected to 6 cycles of DRHT (30 min water removal+30 min reflux+30 min rehydration with 60 mg NaOH per 100 mL of solution). FIG. 31 (panel a) shows the XRD of the product at each cycle, and FIG. 31 (panel b) shows the yields and change of crystal size (with DLS) for each cycle. This entire process was then repeated again with removal of products only after the final cycle (process was 1 hour of dehydration+19 hours of reflux+1 hour of rehydration plus 6 cycles of 30 min dehydration+30 min reflux+30 min rehydration with 60 mg NaOH per 100 mL of solution in each rehydration process). This process took 29 hours to complete, with a final yield was 93% and an average particle size of 89 nm (as determined by DLS). The XRD patter was typical of FAU (FIG. 32, panel a). A TEM micrograph of the product is included in FIG. 32 (panel b), and was used to calculated the average particle size (FIG. 32, panel c). The average particle size, as calculated from the TEM, was 29±7 nm.

Discussion

Regular hydrothermal treatment of Comp A afforded ~40 nm crystals in a period of 4 days with an overall yield of ~10%. Seeding Comp A did not appear to have any effect on the crystallization. Microwave radiation had a major effect. Specifically, microwave irradiation resulted in rapid growth of large zeolite A crystals, while also increasing the growth of nanoFAU. Because LTA and FAU differed in size by an order of magnitude, they could be readily separated, allowing the isolation of ~96 nm FAU (by DLS) at a yield of 7.3% in a four hour period. The LTA yield was 39%, suggesting that microwave irradiation was primarily directing the synthesis towards LTA.

DRHT treatment resulted in nanoFAU with a size of 64 nm and yield of 6.9% over a period of 20 hours. The amount of water removed during the dehydration step was shown to influence nanoFAU formation. At 25% water removal, nanoFAU was formed; however, with 50% water removal, the system was directed towards LTA. In Composition A, Na/Al was 0.048, while the highest Na/Al reported for pure zeolite Y synthesis is 0.07, thus 25% (v/v) water removal approaches approximately the upper limit of $Na^+$ concentration for pure zeolite Y synthesis.

A starting composition with 25% less water led to SOD, suggesting that the effects of DRHT were not simply arising from the dehydration step.

Thus, both microwave and increasing [$OH^-$] beyond a certain limit pushed the composition towards LTA. A suitable hypothesis is that the 3-day aging step creates a finite amount of FAU nuclei, and the rest of the nutrients are in a pre-embryonic stage. Heating either under reflux or by microwave will promote FAU growth, but the yields are limited (<10%) because the extent of nucleation is limited. Increasing [$Na^+$] by enhancing water removal during reflux or raising temperature via microwave heating directs the preembryonic stage into LTA.

Thus, the most efficient method for producing the largest amount (~7-8%) of nanoFAU from Comp A in the shortest period of time (~20 hours) is via the DRHT method. Microwave can produce similar nanoFAU yields in 4 hours, but this process also depletes the nutrients from the composition because of LTA formation, and cannot be used for subsequent experiments.

Characteristics of Supernatant of CompA

The supernatant recovered after the hydrothermal process with agComp A contained unreacted nutrients and particles that could be used to prepare FAU. After 4 days of heating Comp A, pure FAU was recovered from the supernatant. This suggested that during the 4-day heating period, structures were generated in the composition, which could restructure into FAU upon addition of $Na^+$. With the DRHT method, this 4-day heating period could be shortened to 20 hours.

The particles in the supernatant include small crystals of zeolite Y along with amorphous particles, but the latter are primed for growth into FAU either by MW or DRHT. Once the level of nucleation present in the 4-day supernatant is achieved by hydrothermal or by DRHT (20 hours), then DRHT cycling can very effectively produce the desired nanozeolite product. The dehydration results in a more alkaline solution which speeds growth, thereby shortening the period of hydrothermal treatment. Rehydration restores the balance of $Na^+/Al/OH^-$.

With each cycle, the average crystallite size increases slightly. This is consistent with the fact that nucleation is limited. The number of nuclei is limited, and upon adding $Na^+$, these nuclei grow into FAU crystals. The amount of $Na^+$ added is an important parameter. If too much $Na^+$ is added, LTA is formed from the non-nucleated portion of the supernatant. LTA formation is more rapid and utilizes all available nutrients. Since the amount of nutrients decrease with each cycle, there are fewer nuclei and for the same $Na^+$ addition, these nuclei grow to larger particle size.

This synthesis process has two end points. If the interest is in a specific size then the process can be interrupted at an appropriate cycle. For maximum yield and speed of synthesis, the DRHT process can be continued with an initial 20 hr treatment, followed by 6 1.5 hour cycles for yield of 90%, with average size of ~30 nm.

Conclusion

In this study, synthesis parameters were optimized for a very commonly used composition 0.048 $Na_2O$: 2.40 $(TMA)_2O(2OH)$: 1.2 $(TMA)_2O(2Br)$: 4.35 $SiO_2$: 1.0 $Al_2O_3$: 249 $H_2O$ s to maximize the synthesis rate and yield of nanoFAU from clear solution. As prepared aged composition subjected to microwave and DRHT speeded up nanoFAU formation, In the initial synthesis stage from aged solution, $Na^+$ concentration has to be controlled low enough to prevent formation of zeolite A. After zeolite Y nucleation is complete, $Na^+$ is added to synthesis composition continuously and rapidly for maximized synthesis rate of pure FAU. Overall synthesis rate has been improved to 3%/hour. With accelerated synthesis, and therefore lower costs, nano zeolites become strong candidates for industrial scale applications.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making alumino-silicate nanoparticles comprising:
   (a) heating a first mixture comprising a silicon source, an aluminum source, a base, an organic agent, and a first solvent to produce a first population of alumino-silicate nanoparticles dispersed in a first supernatant;
   (b) separating the first population of inorganic nanoparticles from the first supernatant;
   (c) adding a base to the first supernatant to form a second mixture;
   (d) heating the second mixture to produce a second population of alumino-silicate nanoparticles dispersed in a second supernatant; and
   (e) separating the second population of inorganic nanoparticles from the second supernatant;
   wherein the method comprises repeating steps (c) and (d) prior to performing step (e); and
   wherein the first population of alumino-silicate nanoparticles and the second population of alumino-silicate nanoparticles each have an average particle size of 100 nm or less.

2. The method of claim 1, wherein step (d) further comprises concentrating the second supernatant to form a concentrated supernatant, and diluting the concentrated supernatant the reform the second supernatant.

3. The method of claim 2 wherein step (d) further comprises concentrating the second supernatant to form a concentrated supernatant, heating the concentrated supernatant, and diluting the concentrated supernatant the reform the second supernatant.

4. The method of claim 1, wherein steps (c) and (d) are repeated at least 5 times prior to performing step (e).

5. The method of claim 1, wherein steps (c) and (d) are repeated until the yield of the second population of alumino-silicate nanoparticles is at least 75%.

6. The method of claim 2, wherein concentrating the second supernatant comprises removing a portion of the first solvent.

7. The method of claim 6, wherein the portion of first solvent removed is from 20% to 70% by volume of the second supernatant.

8. The method of claim 2, wherein diluting the concentrated supernatant comprises adding a second solvent to the concentrated supernatant.

9. The method of claim 8, wherein the second solvent added to the concentrated supernatant is from 20% to 70% by volume of the second supernatant.

10. The method of claim 8, wherein the second solvent comprises water.

11. The method of claim 8, wherein the second solvent further comprises a base.

12. The method of claim 1, wherein the first solvent comprises water.

13. The method of claim 1, wherein the silicon source comprises tetraethylorthosilane, colloidal silica, disodium metasilicate, or combinations thereof.

14. The method of claim 1, wherein the base is selected from sodium hydroxide, potassium hydroxide, and combinations thereof.

15. The method of claim 1, wherein the organic agent comprises tetrapropyl ammonium hydroxide, tetramethyl ammonium hydroxide, tetramethyl ammonium bromide, tetrapropyl ammonium bromide, or combinations thereof.

16. The method of claim 1, wherein the aluminum source comprises aluminum isopropoxide, sodium aluminate, aluminum sulfate, or combinations thereof.

17. The method of claim 1, wherein the heating is carried out at from 80-150° C.

18. The method of claim 1, wherein the heating comprises irradiating the mixture with microwave radiation.

19. The method of claim 1, wherein the alumino-silicate nanoparticles comprise zeolite nanoparticles.

20. The method of claim 1, wherein the alumino-silicate nanoparticles comprise a crystalline alumino-silicate nanoparticle.

21. The method of claim 1, wherein the alumino-silicate nanoparticles comprise zeolites having a faujasite structure.

22. A method of making alumino-silicate nanoparticles comprising:
    (a) heating a first mixture comprising a silicon source, an aluminum source, a base, an organic agent, and a first solvent to produce a first population of alumino-silicate nanoparticles dispersed in a first supernatant;
    (b) separating the first population of inorganic nanoparticles from the first supernatant;
    (c) adding a base to the first supernatant to form a second mixture;
    (d) heating the second mixture to produce a second population of alumino-silicate nanoparticles dispersed in a second supernatant; and
    (e) separating the second population of inorganic nanoparticles from the second supernatant;
    wherein step (d) further comprises concentrating the second supernatant to form a concentrated supernatant, and diluting the concentrated supernatant the reform the second supernatant; and
    wherein the first population of alumino-silicate nanoparticles and the second population of alumino-silicate nanoparticles each have an average particle size of 100 nm or less.

23. A method of making alumino-silicate nanoparticles comprising:
    (a) heating a first mixture comprising a silicon source, an aluminum source, a base, an organic agent, and a first solvent to produce a first population of alumino-silicate nanoparticles dispersed in a first supernatant;
    (b) separating the first population of inorganic nanoparticles from the first supernatant;
    (c) adding a base to the first supernatant to form a second mixture;
    (d) heating the second mixture to produce a second population of alumino-silicate nanoparticles dispersed in a second supernatant; and
    (e) separating the second population of inorganic nanoparticles from the second supernatant;
    wherein the alumino-silicate nanoparticles comprise zeolites having a faujasite structure; and
    wherein the first population of alumino-silicate nanoparticles and the second population of alumino-silicate nanoparticles each have an average particle size of 100 nm or less.

* * * * *